(12) United States Patent
Choi et al.

(10) Patent No.: US 11,956,176 B2
(45) Date of Patent: Apr. 9, 2024

(54) APPARATUS AND METHOD FOR MULTIPLEXING OF INTEGRATED ACCESS AND BACKHAUL (IAB) NODE IN WIRELESS COMMUNICATION SYSTEM

(71) Applicant: Samsung Electronics Co., Ltd., Suwon-si (KR)

(72) Inventors: Seunghoon Choi, Suwon-si (KR); Youngbum Kim, Suwon-si (KR); Hyunseok Ryu, Suwon-si (KR); Sungjin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 17/741,064

(22) Filed: May 10, 2022

(65) Prior Publication Data

US 2022/0368506 A1 Nov. 17, 2022

(30) Foreign Application Priority Data

May 11, 2021 (KR) .................. 10-2021-0060744
Nov. 5, 2021 (KR) .................. 10-2021-0151461

(51) Int. Cl.
*H04L 27/26* (2006.01)
*H04L 5/00* (2006.01)
*H04W 88/14* (2009.01)

(52) U.S. Cl.
CPC ........ *H04L 5/0092* (2013.01); *H04L 27/2607* (2013.01); *H04W 88/14* (2013.01)

(58) Field of Classification Search
CPC . H04L 27/2607; H04L 5/0028; H04L 5/0032; H04L 5/0048; H04L 5/0092;
(Continued)

(56) References Cited

U.S. PATENT DOCUMENTS

2019/0350023 A1 11/2019 Novlan et al.
2022/0086936 A1* 3/2022 Akl .................. H04W 36/08

FOREIGN PATENT DOCUMENTS

WO 2019/194737 A1 10/2019

OTHER PUBLICATIONS

Resource multiplexing and DC in enhanced IAB, R1-2103712, 3GPP TSG RAN WG1 Meeting #104b-e, Apr. 6, 2021 (Year: 2021).*

(Continued)

*Primary Examiner* — Melvin C Marcelo
*Assistant Examiner* — Natali Pascual Peguero
(74) *Attorney, Agent, or Firm* — Jefferson IP Law, LLP

(57) ABSTRACT

The disclosure relates to a $5^{th}$ Generation (5G) or $6^{th}$ Generation (6G) communication system for supporting a higher data transmission rate. A method of operating an Integrated Access and Backhaul (IAB) donor node in a wireless communication system is provided. The method includes transmitting Frequency Division Multiplexing (FDM)-related information or Spatial Division Multiplexing (SDM)-related information to an IAB node, receiving necessary information from the IAB node, and transmitting or receiving backhaul data with respect to the IAB node by applying the FDM or the SMD, based on the FDM-related information or the SMD-related information.

20 Claims, 13 Drawing Sheets

(58) Field of Classification Search
CPC .......... H04L 5/14; H04L 5/0023; H04L 5/16; H04W 88/14
See application file for complete search history.

(56) References Cited

OTHER PUBLICATIONS

Huawei et al. ("Resource multiplexing between backhaul and access for IAB duplexing enhancements", R1-2100219, 3GPP TSG RAN WG1 Meeting #104e, Jan. 19, 2021 (Year: 2021).*
Samsung ("Enhancements to Resource Multiplexing for NR IAB", R1-2103255, 3GPP TSG RAN WG1 Meeting #104b-e, Apr. 7, 2021 (Year: 2021).*
3GPP; 3rd Generation Partnership Project; Technical Specification Group Radio Access Network; NR; NR and NG-RAN Overall Description; Stage 2 (Release 17); 3GPP TS 38.300; V17.0.0; Mar. 2022; Valbonne, France.
3GPP; 3rd Generation Partnership Project; Technical Specification Group Radio Access Network; NG-RAN; F1 application protocol (F1AP) (Release 17); 2022; 3GPP TS 38.473; V17.0.0; Apr. 2022; Valbonne, France.
3GPP; 3rd Generation Partnership Project; Technical Specification Group Radio Access Network; NR; Physical layer procedures for data (Release 17); 3GPP TS 38.214; V17.1.0; Mar. 2022; Valbonne, France.
Ericsson; Resource multiplexing and DC in enhanced IAB; 3GPP TSG-RAN WG1 Meeting #104-bis-e; R1-2103712 Apr. 12-Apr. 20, 2021 e-meeting; Apr. 6, 2021.
Huawei et al.; Resource multiplexing between backhaul and access for IAB duplexing enhancements; 3GPP TSG RAN WG1 Meeting #104-e; R1-2100219; Jan. 25-Feb. 5, 2021 e-meeting; Jan. 19, 2021.
Samsung; Enhancements to Resource Multiplexing for NR IAB; 3GPP TSG RAN WG1 #104b-e; R1-2103255; Apr. 12-Apr. 20, 2021 e-meeting; Apr. 7, 2021.
International Search Report with Written Opinion dated Aug. 18, 2022; International Appln. No. PCT/KR2022/006563.

* cited by examiner

MT TX, DU TX
(601)

MT RX, DU RX
(602)

MT RX, DU TX
(603)

MT TX, DU RX
(604)

APPARATUS AND METHOD FOR MULTIPLEXING OF INTEGRATED ACCESS AND BACKHAUL (IAB) NODE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0060744, filed on May 11, 2021, in the Korean Intellectual Property Office, and of a Korean patent application number 10-2021-0151461, filed on Nov. 5, 2021, in the Korean Intellectual Property Office, the disclosure of each of which is incorporated by reference herein in its entirety.

BACKGROUND

1. Field

The disclosure relates to a wireless communication system. More particularly, the disclosure relates to a method and apparatus for multiplexing an Integrated Access and Backhaul (IAB) node.

2. Description of Related Art

5th Generation (5G) mobile communication technologies define broad frequency bands such that high transmission rates and new services are possible, and can be implemented not only in "Sub 6 Giga hertz (GHz)" bands such as 3.5 GHz, but also in "Above 6 GHz" bands referred to as mmWave including 28 GHz and 39 GHz. In addition, it has been considered to implement $6^{th}$ Generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input and Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Meanwhile, the Internet has evolved from a human-based connection network, in which humans create and consume information, to the Internet of Things (IoT), in which distributed elements, such as objects, exchange information with each other to process the information. An Internet of Everything (IoE) technique is emerging, in which a technique related to the IoT is combined with, for example, a technique for processing big data through connection with a cloud server or the like. In order to implement the IoT, various technological components are required, such as a sensing technique, wired/wireless communication and network infrastructures, a service interface technique, a security technique, or the like. Therefore, in recent years, a technique including a sensor network for connecting objects, Machine to Machine (M2M) communication, Machine Type Communication (MTC), or the like have been studied. In the IoT environment, intelligent Internet Technology (IT) services may be provided to collect and analyze data obtained from connected objects to create new value in human life. As existing Information Technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Accordingly, various attempts are being made to apply 5G communication systems to the IoT network. For example, techniques related to sensor networks, M2M communication, MTC, etc., are being implemented by using a 5G communication technique including beam-forming, Multiple-Input and Multiple-Output (MIMO), array antennas, etc. The application of cloud-Radio Access Network (RAN) as a big data processing technique described above may be an example of convergence of the 5G communication technique and the IoT technique.

Various studies have recently been conducted to utilize an IAB technique, which requires improvement of a dual connectivity of an IAB node.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for multiplexing a resource of a Distributed Unit (DU) and Mobile Termination (MT) of an Integrated Access and Backhaul (IAB) node in a wireless communication system.

Another aspect of the disclosure is to provide a DU resource type for supporting Frequency Division Multiplexing (FDM) of an IAB node, and an operation of the IAB node.

Another aspect of the disclosure is to provide a DU resource type for supporting Spatial Division Multiplexing (SDM) of an IAB node, and an operation of the IAB node.

Additional aspects will be set forth in part in the description which follows and, in part, will be apparent from the description, or may be learned by practice of the presented embodiments.

In accordance with an aspect of the disclosure, a method of operating an Integrated Access and Backhaul (IAB) donor node in a wireless communication system is provided. The method includes transmitting Frequency Division Multiplexing (FDM)-related information or Spatial Division Multiplexing (SDM)-related information to an IAB node, receiving necessary information from the IAB node, and transmitting or receiving backhaul data with respect to the IAB node by applying the FDM or the SMD, based on the FDM-related information or the SMD-related information.

In accordance with another aspect of the disclosure, a method of operating an IAB node in a wireless communication system is provided. The method includes receiving FDM-related information or SDM-related information from an IAB donor node, transmitting necessary information to the IAB donor node, and transmitting or receiving backhaul data with respect to the IAB donor node by applying the FDM or the SMD, based on the FDM-related information or the SMD-related information.

An apparatus and method according to embodiments of the disclosure provide an apparatus and method for reducing transmission/reception interference between a Distributed Unit (DU) and Mobile Termination (MT) of an Integrated Access and Backhaul (IAB) node, when a resource of the DU and MT of the IAB node is multiplexed using Frequency Division Multiplexing (FDM).

An apparatus and method according to embodiments of the disclosure provide an apparatus and method for transmitting/receiving data, when a resource of a DU and MT of an IAB node is multiplexed using Spatial Division Multiplexing (SDM).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
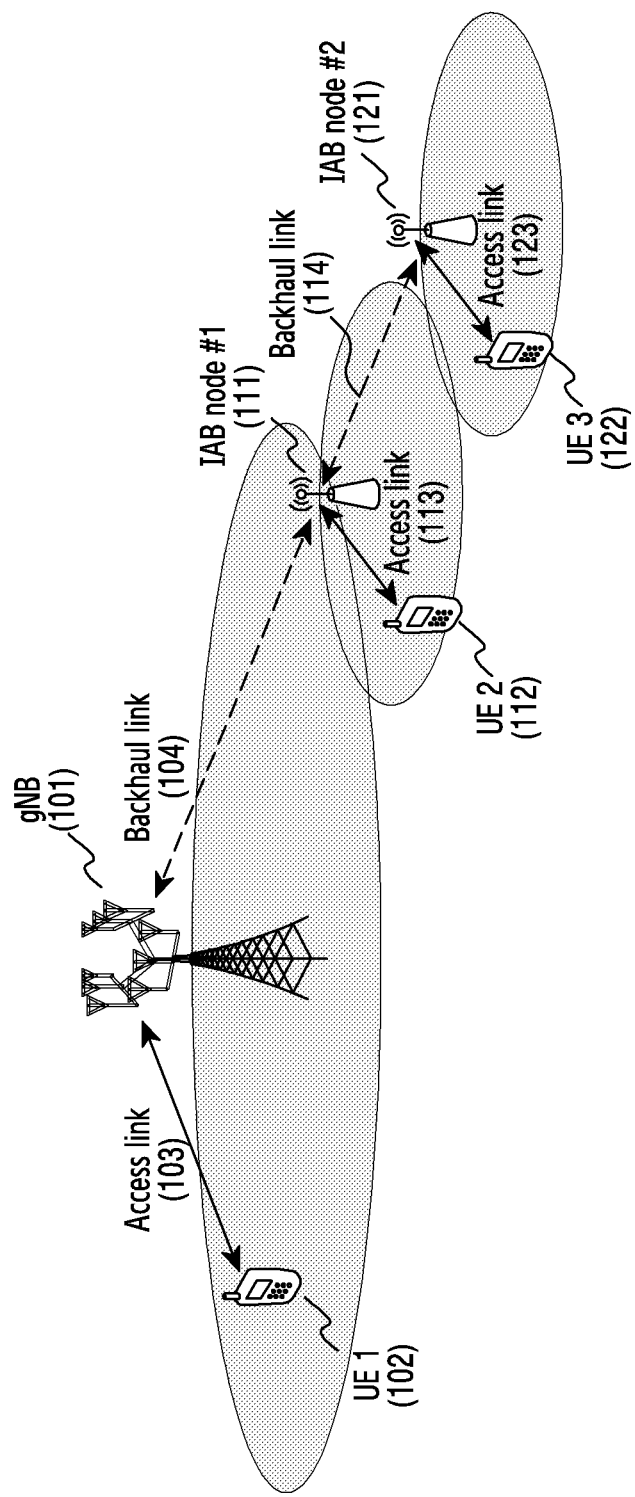
FIG. 1 illustrates an example of a wireless communication system in which an Integrated Access and Backhaul (IAB) node operates according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms used and words in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Although terms related to signals and messages used in the following description (e.g., Radio Resource Control (RRC) signaling, messages, signals, Non-Access Stratum (NAS) messages, NAS signaling) are described based on terms defined in current 3$^{rd}$ Generation Partnership Project (3GPP) Long Term Evolution (LTE) or New Radio (NR) standards, other terms having equivalent technical meanings may also be used. In addition, terms (e.g., a base station, a terminal, a communication node, a radio node, a radio unit, a network node, a Master Node (MN), a Secondary Node (SN), a Transmission/Reception Point (TRP), a Digital Unit (DU), a Radio Unit (RU), a Radio Access Network (RAN) node, an eNB, a gNB, an Access and Mobility Management Function (AMF), a Central Unit (CU), or the like) referring to network entities used in the following description are disclosed to describe embodiments. Therefore, the disclosure is not limited to the terms described below, and other terms having equivalent technical meanings may also be used.

In addition, the disclosure describes various embodiments by using terms used in some communication standards (e.g., LTE and NR defined in 3GPP). A 3GPP mobile communication system described herein may include both 4th generation (4G) (hereinafter, LTE) and 5G (hereinafter, NR). However, embodiments of the disclosure may be easily modified and applied also to other communication systems in addition to the 3GPP mobile communication system.

In addition, although an expression 'greater than' or 'less than' is used in the disclosure to determine whether a specific condition is satisfied or fulfilled, this does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

Embodiments of the disclosure will be described herein below with reference to the accompanying drawings. In this case, it should be noted that like reference numerals denote like constitutional elements in the accompanying drawings. In the following description, well-known functions or constructions are not described in detail since they would obscure the disclosure in unnecessary detail.

In describing the embodiments, descriptions which are well known in the technical field to which the disclosure belongs and are not related directly to the disclosure will be omitted. This is to convey the disclosure more clearly by omitting unnecessary description.

For the same reason, some components may be exaggerated, omitted, or schematically illustrated in the accompanying drawings. Also, a size of each component does not completely reflect an actual size. In the drawings, like reference numerals denote like or corresponding components.

Advantages and features of the disclosure and methods of accomplishing the same may be understood more clearly by reference to the following detailed description of the embodiments and the accompanying drawings. However, the disclosure is not limited to embodiments disclosed below, and may be implemented in various forms. Rather, the embodiments are provided to complete the disclosure and to fully convey the concept of the disclosure to one of those ordinarily skilled in the art, and the disclosure will only be defined by the scope of claims. Throughout the specification, like reference numerals denote like components.

In this case, it will be understood that blocks of processing flow diagrams and combinations of the flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create a means for performing functions described in the block(s) of the flow diagram. The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing an instruction means for performing the functions described in the block(s) of the flow diagram. The computer program instructions may also be loaded into a computer or another programmable data processing apparatus, and thus, instructions for operating the computer or another programmable data processing apparatus by generating a computer-executed process when a series of operations are performed in the computer or another programmable data processing apparatus may provide operations for performing the functions described in the block(s) of the flow diagram.

In addition, each block may represent part of a module, segment, or code which includes one or more executable instructions for executing specified logical function(s). It should also be noted that in some alternative implementations, functions mentioned in blocks may occur not in an orderly manner. For example, two blocks illustrated successively may actually be executed substantially concurrently, or the blocks may sometimes be performed in a reverse order according to corresponding functions.

The term 'unit' used herein means a software or hardware component, such as a Field Programmable Gate Array (FPGA) or Application Specific Integrated Circuit (ASIC), which performs certain tasks. However, the 'unit' is not limited to the software or hardware component. The 'unit' may be configured to reside on an addressable storage medium and configured to execute on one or more processors. Thus, for example, the 'unit' may include components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and 'units' may be combined into fewer components or further separated into additional components and units. In addition thereto, the components and units may be implemented to reproduce one or more Central Processing Units (CPUs) included in a device or a security multimedia card.

A wireless communication system is developed to a broadband wireless communication system which provides a high-speed and high-quality packet data service beyond the early voice-oriented services as in a communication standard, for example, High Speed Packet Access (HSPA), Long Term Evolution (LTE), Evolved Universal Terrestrial Radio Access (E-UTRA), or LTE-advanced (LTE-A) of 3GPP, High Rate Packet Data (HRPD) or Ultra Mobile Broadband (UMB) of 3GPP2, and 802.16e or the like of IEEE.

As a representative example of the broadband wireless communication system, the LTE system has adopted an Orthogonal Frequency Division Multiplexing (OFDM) scheme in a DownLink (DL) and has adopted a Single Carrier Frequency Division Multiple Access (SC-FDMA) scheme in an UpLink (UL). The UL refers to a radio link through which a terminal (a User Equipment (UE) or a Mobile Station (MS)) transmits data or a control signal to a Base Station (BS) (e.g., eNodeB), and the DL refers to a radio link through which the BS transmits data or a control signal to the terminal. In such a multiple access scheme, data or control information of each user is classified by generally assigning and operating the data or control information such that time-frequency resources for transmitting data or control information for each user do not overlap each other, that is, such that orthogonality is established.

As a future communication system after LTE system, a 5G (or NR) communication system has to be able to freely reflect various requirements of a user and a service provider, and thus, services satisfying various requirements at the same time need to be supported. The services considered for the 5G communication system include enhanced Mobile BroadBand (eMBB), massive Machine Type Communication (mMTC), Ultra Reliability Low Latency Communication (URLLC), etc.

The eMBB aims to provide a higher data rate than a data rate supported by the existing LTE, LTE-A, or LTE-Pro. For example, in the 5G communication system, the eMBB shall be able to provide a peak data rate of 20 Gbps in the DL and a peak data rate of 10 Gbps in the UL from the viewpoint of one BS. In addition, the 5G communication system shall provide an increased user-perceived data rate simultaneously with providing the peak data rate. In order to satisfy such requirements, improvement of various transmitting/receiving techniques including a further improved Multiple-Input and Multiple-Output (MIMO) transmission technique is required. In addition, signals are transmitted using a transmission bandwidth of up to 20 MHz in a 2 GHz band used in the current LTE, but the 5G communication system uses a bandwidth wider than 20 MHz in a frequency band of 3 to 6 GHz or more than 6 GHz, thereby satisfying a data rate required in the 5G communication system.

At the same time, mMTC is being considered to support application services such as Internet of Things (IoT) in the 5G communication system. The mMTC is required for an access support of a large-scale terminal in a cell, coverage enhancement of a terminal, improved battery time, and cost reduction of the terminal in order to efficiently provide the IoT. The IoT needs to be able to support a large number of terminals (e.g., 1,000,000 terminals/km2) in a cell because it is attached to various sensors and various devices to provide communication functions. In addition, the terminals supporting the mMTC are more likely to be positioned in shaded areas not covered by a cell, such as an underground of a building due to nature of services, and thus, the terminal requires a wider coverage than other services provided by the 5G communication system. The terminals which support the mMTC shall be configured as inexpensive terminals and require very long battery lifetime, such as 10 to 15 years, because it is difficult to frequently replace batteries of the terminals.

Lastly, the URLLC is a cellular-based wireless communication system used for a specific purpose (mission-critical). For example, a service used in remote control for a robot or machinery, industrial automation, unmanned aerial vehicle, remote health care, or emergency alert may be considered. Accordingly, communication provided by the URLLC shall provide very low latency and very high reliability. For example, a service supporting the URLLC shall satisfy air interface latency smaller than 0.5 milliseconds and at the same time, has a packet error rate of $10^{-5}$ or less. Accordingly, for the service supporting the URLLC, the 5G system is required to provide a Transmit Time Interval (TTI) shorter than those for other services while securing reliable communication links by allocating a broad resource in a frequency band.

The three services, that is, eMBB, URLLC, and mMTC, of 5G may be transmitted by being multiplexed in one system. In this case, the services may use different transmission/reception methods and transmission/reception parameters in order to meet different requirements thereof.

In the following description, terms for identifying an access node, terms referring to network entities, a term referring to message, terms referring to interfaces between network entities, terms referring to a variety of identification information, or the like are exemplified for convenience of explanation. Therefore, the disclosure is not limited to the terms described below, and other terms having equivalent technical meanings may also be used.

Hereinafter, for convenience of explanation, terms and names defined in LTE and NR standards, which are the latest standard defined in the 3GPP organization among communication standards currently existing at present, are used in the disclosure. However, the disclosure is not limited to the terms and names, and is also equally applied to a system conforming to other standards. In particular, the disclosure may be applied to 3GPP NR (5G communication standard).

With an increase in a frequency band (e.g., at least 6 GHz band, in particular, mmWave band), a 5G system may have limited coverage due to propagation path attenuation, when a base station transmits/receives data with respect to a terminal. A plurality of relays (or relay nodes) may be deployed densely between propagation paths of the base station and the terminal to solve the problem caused by the coverage limitation. Accordingly, however, an optical cable to be installed for a backhaul connection between one relay to another relay results in a serious cost problem. Therefore, instead of installing the optical cable between the relays, a radio frequency resource of a wideband available in mmWave may be used to transmit/receive backhaul data between the relays, thereby solving the cost problem occurring when the optical cable is installed and allowing the mmWave band to be used more efficiently.

As described, a technique for transmitting/receiving backhaul data from a base station and transmitting/receiving the data via at least one relay node so that access data is finally transmitted/received to a terminal is called Integrated Access and Backhaul (IAB). In this case, a relay node which transmits/receives data from the base station by using a radio backhaul is called an IAB node. In this case, the base station (or also referred to as a gNB, an IAB donor, etc.) is constructed of a Central Unit (CU) and a Distributed Unit (DU), and the IAB node is constructed of a DU and a Mobile Termination (MT). The CU is responsible for the DU of all IAB nodes coupled to the base station through a multi-hop.

The IAB node may use different frequency bands or the same frequency band when backhaul data is received from the base station and access data is transmitted to the terminal and when access data is received from the terminal and backhaul data is transmitted to the base station. When the same frequency is used in access data reception and backhaul data transmission or in access data transmission and backhaul data reception, the IAB node has half-duplex constraints at a moment. Accordingly, as a method of reducing a transmission/reception delay caused by the half-duplex constraints of the IAB mode, when the IAB node transmits a signal, multiplexing (e.g., FDM and/or SMD) may be performed on backhaul data (e.g., when assuming a situation where a parent IAB node, an IAB node operating as a relay node, and a child node are coupled through a radio backhaul link, uplink data from the MT of the IAB node to the DU of the parent IAB node and downlink data from the DU of the IAB node to the MT of the child IAB node) and access data to the terminal (downlink data from the IAB node to the terminal). TS 38.300 section 4.7 Integrated Access and Backhaul of the 3GPP standard may be used by reference for a relationship between the parent node and child node for the IAB node.

In addition, when the IAB node receives a signal, multiplexing (FDM and/or SDM) may also be performed on backhaul data (downlink data from the DU of the parent IAB node to the MT of the IAB node and uplink data from the MT of the child IAB node to the DU of the IAB node) and access data from the terminal (uplink data from the terminal to the IAB node).

In this case, when the multiplexing scheme (FDM and/or SDM) is supported, it may be necessary to standardize a DU resource type of the IAB node for cooperation between the IAB node and the parent IAB node and an operation of the DU and MT of the IAB node in each DU resource type. Hereinafter, embodiments of the disclosure provide a method of configuring the DU resource type of the IAB node and an operation of the IAB node based thereon when the multiplexing scheme (FDM and/or SDM) is supported.

FIG. 1 illustrates an example of a wireless communication system in which an IAB node operates according to an embodiment of the disclosure.

Referring to FIG. 1, a gNB 101 is a typical base station (e.g., an eNB or a gNB), and may be called a gNB, an eNB, a donor base station, or a donor IAB in the disclosure. The IAB donor may imply an entity which serves the IAB node so that an IAB node described below is coupled to a core network (e.g., an Evolved Packet Core (EPC) or a 5G Core (5GC)). The IAB donor, as a base station, is a network infrastructure which provides radio access to a terminal. The base station has coverage defined as a specific geographic area, based on a distance capable of transmitting/receiving a signal. Hereinafter, the term 'coverage' may be used to refer to a service coverage area in a base station. The base station may cover one cell, or may cover a plurality of cells. Herein, the plurality of cells may be identified by a frequency to be supported and an area of a covered sector.

The base station which is responsible for the IAB donor may be referred to as not only the gNB but also an 'Access Point (AP)', an 'eNodeB (eNB)', a '5th Generation (5G) node', a '5G NodeB (NB)', a 'next generation NodeB (gNB)', a 'wireless point', a 'Transmission/Reception Point (TRP)', or other terms having equivalent technical meanings. In addition, in case of distributed deployment, the base station may be referred to as a Centralized Unit (CU), a Distributed Unit (DU), a Digital Unit (DU), a Radio Unit (RU), a Remote Radio Head (RRH), or other terms having equivalent technical meanings. Although the IAB donor, i.e., the gNB 101, is described in FIG. 1 as one entity, it may also be implemented as distributed entities according to an embodiment. For example, the IAB donor may function by being divided into a CU and a DU.

An IAB node #1 111 and an IAB node #2 121 are IAB nodes which transmit/receive a signal through a backhaul link. As a network entity for radio access and backhaul connectivity, the IAB nodes 111 and 112 may be deployed to increase coverage. Since the backhaul connectivity is configured in a wireless manner, coverage of the gNB 101 which is an IAB donor may be increased without having to install a wired network. For example, the IAB node #1 111 may be deployed around the gNB 101 which is the IAB donor (e.g., within a radio communication radius). The IAB node #1 111 may perform communication by being coupled to the gNB 101 which is the IAB donor through a backhaul link, and may perform communication with a UE #2 112 through a radio link. In addition, the IAB node #2 121 may be deployed around the IAB node #1 111 which is another node (e.g., within a radio communication radius). Coverage may be increased in a high frequency band (e.g., a mmWave band) by deploying each IAB node. Each IAB node may perform not only multi-hop but also relay techniques or a repeater function.

The IAB node may be coupled to a parent node and a child node. For example, from the viewpoint of the IAB node #1 111, the gNB 101 may be referred to as a parent node, and the IAB node #2 121 or the UE #2 112 may be referred to as a child node. In addition, from the viewpoint of the IAB node #2 121, the IAB node #1 111 may be referred to as a child node. A link between the IAB node and the parent node is referred to as a parent link, and a link between the IAB node and the child node is referred to as a child link.

The terminal (e.g., a UE #1 102, the UE #2 112, and a UE #3 122) is a device used by a user, and communicates with the base station or the IAB node through a wireless channel. Hereinafter, the wireless channel between the terminal and the base station or between the terminal and the IAB node is referred to as an access link. In the disclosure, the terminal may include not only an electronic device used by a general user but also, optionally, a device which performs Machine Type Communication (MTC) operable without a user's intervention. The terminal may be referred to as a 'User Equipment (UE)', a 'mobile station', a 'subscriber station', a 'Customer Premises Equipment (CPE)', a 'remote terminal', a 'wireless terminal', an 'electronic device', a 'vehicle terminal', a 'user device', or other terms having equivalent technical meanings.

The UE #1 102 may transmit/receive access data with respect to the gNB 101 through an access link 103. The IAB node #1 111 may transmit/receive backhaul data with respect to the gNB 101 through a backhaul link 104. The UE #2 112 may transmit/receive access data with respect to the IAB node #1 111 through an access link 113. The IAB node #2 121 may transmit/receive backhaul data with respect to the IAB node #1 111 through a backhaul link 114. Accordingly, the IAB node #1 111 is a higher IAB node of the IAB node #2 121, and is called a parent IAB node, and the IAB node #2 121 is a lower IAB node of the IAB node #1 111, and is called a child IAB node. The UE #3 122 transmits/receives access data. With respect to the IAB node #2 121 through an access link 123. In FIG. 1, the backhaul links 104 and 114 may use a radio backhaul link.

Hereinafter, the disclosure describes measurement on an IAB node of a terminal or a donor gNB.

In order for the UE #2 112 or the UE #3 122 to perform measurement on an IAB node or a neighboring donor gNB other than a serving IAB node, coordination may be required between the donor gNB and the IAB nodes. That is, the donor gNB may match a measurement resource of an IAB node having an even-numbered hop order or match a measurement resource of an IAB node having an odd-numbered hop order, so that the terminal minimizes waste of resources for performing measurement of a neighboring IAB node or an IAB base station. For measurement of the neighboring IAB node, the terminal may receive configuration information indicating measurement of Synchronization Signal Block (SSB)/Physical Broadcast Channel (PBCH) or Channel State Information Reference Signal (CSI-RS) from the serving IAB node or base station through higher-layer signaling (a higher-layer signal, e.g., Radio Resource Control (RRC) signaling). If the terminal is configured to measure a neighboring base station through the SSB/PBCH, at least two SSB/PBCH Measurement Timing Configurations (SMTCs) may be configured for each frequency in the terminal for measurement resources of the IAB node having the even-numbered hop order or measurement resources of the IAB node having the odd-numbered hop order. The terminal which has received the configuration information may perform measurement of the IAB node having the even-numbered hop order in one SMTC, and may perform measurement of the IAB node having the odd-numbered hop order in another SMTC.

Hereinafter, the disclosure describes measurement on an IAB node or another IAB node of donor gNBs.

In order for one IAB node to perform measurement on another neighboring donor gNB or IAB node, coordination may be required between the donor gNB and IAB nodes. That is, the donor gNB may match a measurement resource of an IAB node having an even-numbered hop order or match a measurement resource of an IAB node having an odd-numbered hop order, so that one IAB node minimizes waste of resources for performing measurement of a neighboring IAB node or an IAB base station. For measurement of the neighboring IAB node, one IAB node may receive configuration information indicating measurement of SSB/PBCH or CSI-RS from a serving IAB node or base station through higher-layer signaling (a higher-layer signal, e.g., RRC signaling). If the IAB node is configured to measure a neighboring base station through the SSB/PBCH, at least two SSB/PBCH Measurement Timing Configurations (SMTCs) may be configured for each frequency in the IAB node for measurement resources of the IAB node having the even-numbered hop order or measurement resources of the IAB node having the odd-numbered hop order. The IAB node which has received the configuration information may perform measurement of the IAB node having the even-numbered hop order in one SMTC, and may perform measurement of the IAB node having the odd-numbered hop order in another SMTC.

Hereinafter, in an IAB technique proposed in the disclosure, it is described in greater detail with reference to FIGS. 2A, 2B, 3A, 3B, 4A, and 4B that a backhaul link between a base station and an IAB node or between one IAB node and another IAB node and an access link between a base station and a terminal or between an IAB node and a terminal are multiplexed in a radio resource.

Figure 2A:
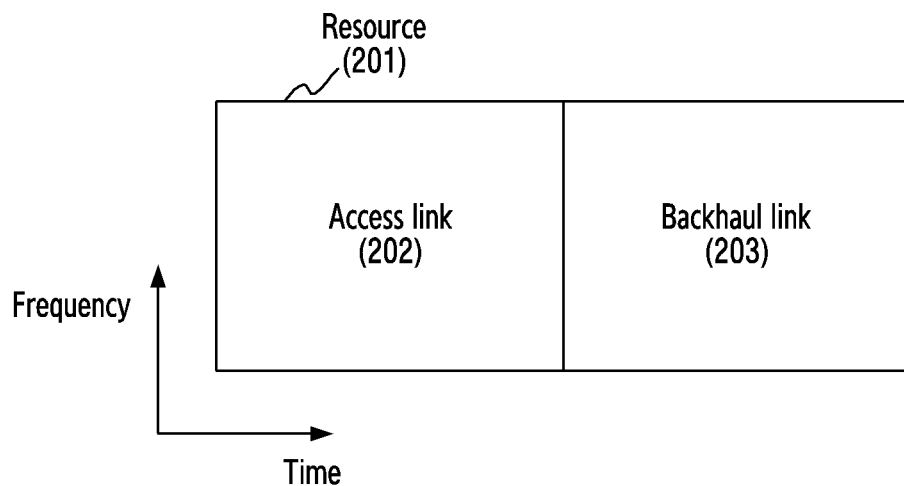
FIGS. 2A and 2B schematically illustrate examples in which resources are multiplexed between an access link and a backhaul link in an IAB node according to various embodiments of the disclosure.
Figure 2B:
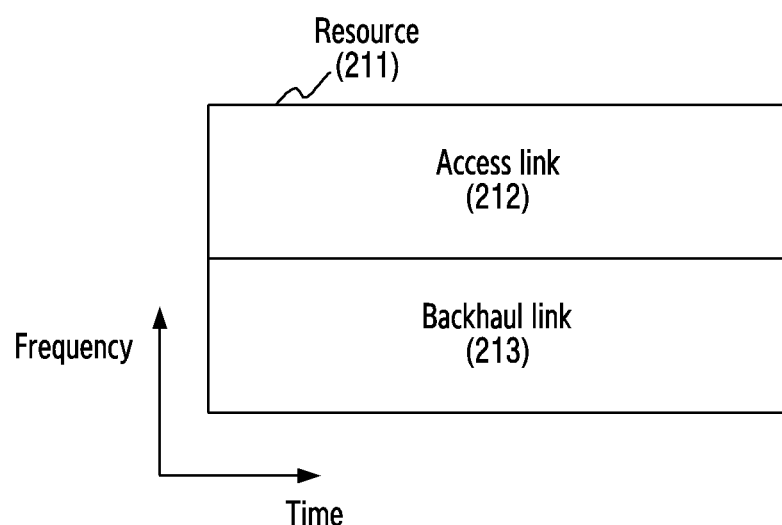

FIGS. 2A and 2B schematically illustrate examples in which resources are multiplexed between an access link and a backhaul link in an IAB node according to various embodiments of the disclosure.

Referring to FIG. 2A, it illustrates an example in which resources are multiplexed in a time domain between an access link and a backhaul link in an IAB node. FIG. 2B illustrates an example in which resources are multiplexed in a frequency domain between an access link and a backhaul link in an IAB node.

FIG. 2A illustrates an example in which a backhaul link 203 between a base station and an IAB node or between an IAB node and another IAB node and an access link 202 between a base station and a terminal or between an IAB node and a terminal are subjected to Time Domain Multiplexing (TDM) in a radio resource 201.

When resources are multiplexed in the time domain between the access link and the backhaul link in the IAB node as shown in FIG. 2A, data is not transmitted/received between the base station and the IAB node in the time domain in which the base station or the IAB node transmits/ receive data with respect to the terminal. In addition, when resources are multiplexed in the time domain between the access link and the backhaul link in the IAB node, the base station or the IAB node does not transmit/receive data with respect to the terminal in the time domain in which data is transmitted/received between the base station and the IAB nodes.

FIG. 2B illustrates an example in which a backhaul link 213 between a base station and an IAB node or between an IAB node and another IAB node and an access link 212 between a base station and a terminal or between an IAB node and a terminal are subjected to Frequency Domain Multiplexing (FDM) in a radio resource 211. Therefore, it is possible to transmit/receive data between the base station and the IAB node in a time domain in which the base station or the IAB node transmits/receives data with respect to the terminal. However, only data transmission in the same direction is possible due to half-duplex constraints of IAB nodes. For example, in the time domain in which a first IAB node receives data from the terminal, the first IAB node is able to receive only backhaul data from another IAB node or the base station. In addition, in the time domain in which the first IAB node transmits data to the terminal, the first IAB node is able to transmit only backhaul data to another IAB node or the base station.

Although only TDM and FDM are described in FIGS. 2A and 2B among multiplexing schemes, Spatial Domain Multiplexing (SDM) is possible between an access link and a backhaul link. Therefore, although transmission/reception between the access link and the backhaul link are possible at the same time through the SDM, only data transmission in the same direction is possible in the SDM due to half-duplex constraints of the IAB nodes as in the FDM of FIG. 2B above. For example, in the time domain in which the first IAB node receives data from the terminal, the first IAB node is able to only receive backhaul data from another IAB node or the base station. In addition, in the time domain in which the first IAB node transmits data to the terminal, the first IAB node is able to only transmit backhaul data to another IAB node or the base station.

Information regarding which multiplexing scheme will be used among the TDM, the FDM, and the SDM may be transferred between the 'IAB node' and the 'base station or higher IAB node' in various manners. According to embodiments, when the IAB node initially accesses to the base station or the higher IAB node, the IAB node may transmit capability information for the multiplexing scheme to the base station or the higher IAB node (e.g., the parent IAB node). Alternatively, according to embodiments, the IAB node may receive information regarding which multiplexing scheme will be used from a corresponding base station or higher IAB nodes through system information or higher layer signaling information (a higher layer signal) such as Radio Resource Control (RRC) information or Medium Access Control (MAC) Control Element (CE).

Alternatively, according to embodiments, after initial access, information regarding which multiplexing schemes will be used may be received from the base station or the higher IAB nodes through a backhaul link. Alternatively, according to embodiments, after the IAB node transmits the capability information to the base station or the higher IAB node, which multiplexing scheme will be used may be implemented by the IAB node, and which multiplexing scheme will be used during a specific slot or radio frame or a specific duration or continuously thereafter may be reported to the base station or the higher IAB nodes through backhaul or higher layer signaling information.

Although the multiplexing scheme between the access link and the backhaul link has been mainly described in FIGS. 2A and 2B, multiplexing used between one backhaul link and another backhaul link may be the same as the multiplexing used between the access link and the backhaul link. For example, multiplexing of (a backhaul link of) a Mobile Termination (MT) and (a backhaul link or an access link of) a DU in an IAB node to be described below may be described according to the method described in the example of FIGS. 2A and 2B.

Figure 3A:
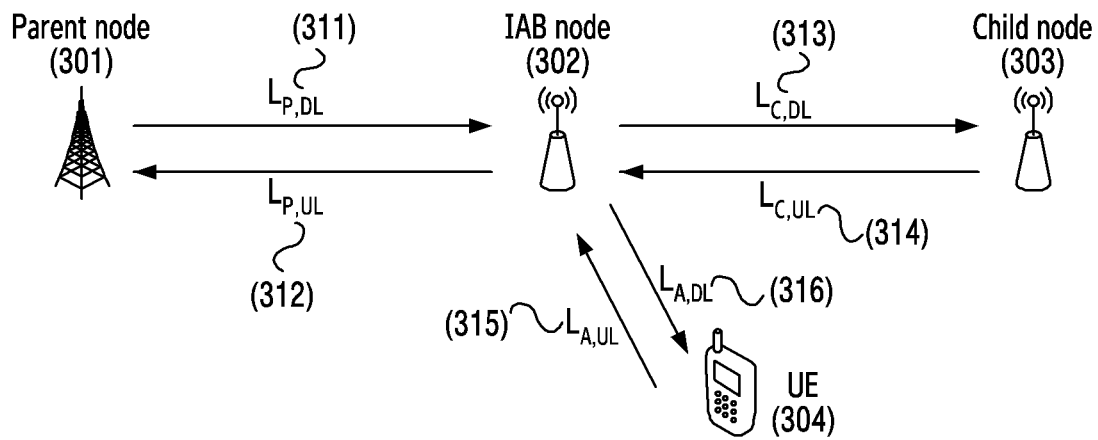
FIGS. 3A and 3B illustrate examples in which resources are multiplexed in a time domain between an access link and a backhaul link in an IAB node according to various embodiments of the disclosure.
Figure 3B:
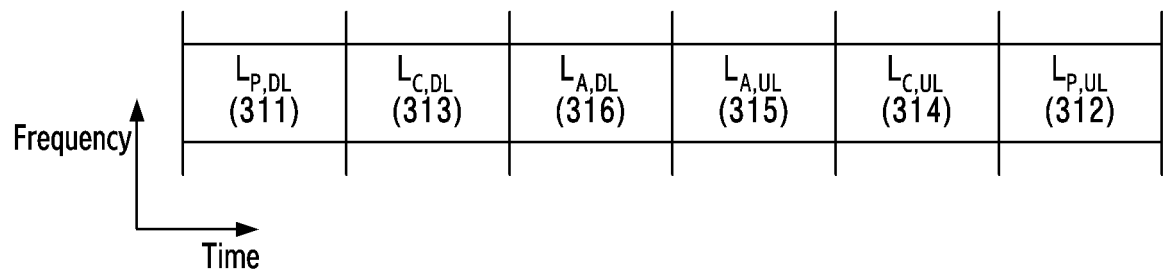

FIGS. 3A and 3B illustrate examples in which resources are multiplexed in a time domain between an access link and a backhaul link in an IAB node according to various embodiments of the disclosure.

Referring to FIGS. 3A and 3B, a process in which an IAB node 302 communicates with a parent node 301, a child IAB node (a child node) 303, and a UE 304 is exemplified in FIG. 3A. A link between respective nodes will be described in greater detail. The parent node 301 may transmit a backhaul downlink signal to the IAB node 302 through a backhaul downlink $L_{P,DL}$ 311. The IAB node 302 may transmit a backhaul uplink signal to the parent node 301 through a backhaul uplink $L_{P,UL}$ 312. The IAB node 302 may transmit an access downlink signal to the UE 304 through an access downlink $L_{A,DL}$ 316. The UE 304 may transmit an access uplink signal to the IAB node 302 through an access uplink $L_{A,UL}$ 315. The IAB node 302 may transmit a backhaul downlink signal to the child IAB node 303 through a backhaul downlink $L_{C,DL}$ 313. The child IAB node 303 may transmit a backhaul uplink signal to the IAB node 302 through a backhaul uplink $L_{C,UL}$ 314. In the aforementioned example of FIGS. 3A and 3B, a subscript P means a backhaul link with the parent, a subscript A means an access link with the UE, and a subscript C means a backhaul link with the child.

A link relationship of FIGS. 3A and 3B is described based on the IAB node 302. From the viewpoint of the child IAB node 303, the parent node is the IAB node 302, and the child IAB node 303 may have another IAB child node at a lower level. In addition, from the viewpoint of the parent node 301, the child node is the IAB node 302, and the parent node 301 may have another IAB parent node at a higher level.

In the description above, a backhaul uplink/downlink signal and an access uplink/downlink signal may include data and control information, or a channel for transmitting the data and control information, or a reference signal required to decode the data and control information, or at least one of reference signals for reporting channel information.

FIG. 3B illustrates an example in which all of the aforementioned links are multiplexed in a time domain. In the example of FIGS. 3A and 3B, the backhaul downlink $L_{C,DL}$ 313, the access downlink $L_{A,DL}$ 316, the access uplink $L_{A,UL}$ 315, the backhaul uplink $L_{C,UL}$ 314, and the backhaul uplink $L_{P,UL}$ 312 are multiplexed in time order. The order of links proposed in the example of FIGS. 3A and 3B is for exemplary purposes only, and any order may be applied without conditions.

Since the links are multiplexed in the time domain in time order, when a signal is transmitted from the parent node 301 to the child IAB node 303 via the IAB node 302 and the signal is transmitted to the terminal in this time-division manner, it can be seen that this is a multiplexing scheme which takes a lot of time. Accordingly, a method in which transmission is performed at the same time by multiplexing a backhaul link and another backhaul link or a backhaul link and an access link in a frequency domain or a spatial domain may be considered as a method for reducing a latency when the signal is finally transmitted from the parent node 301 to the terminal.

Figure 4A:
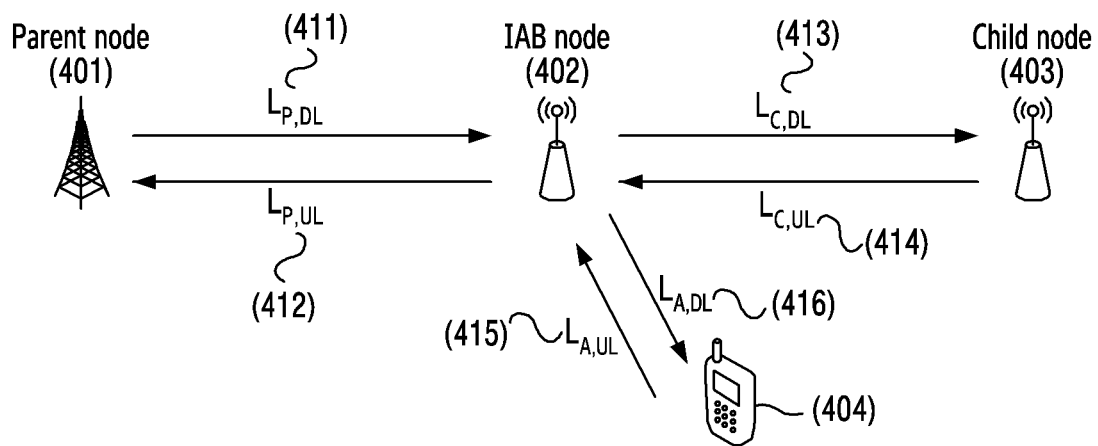
FIGS. 4A and 4B illustrate examples in which resources are multiplexed in frequency and spatial domains between an access link and a backhaul link in an IAB node according to various embodiments of the disclosure.
Figure 4B:
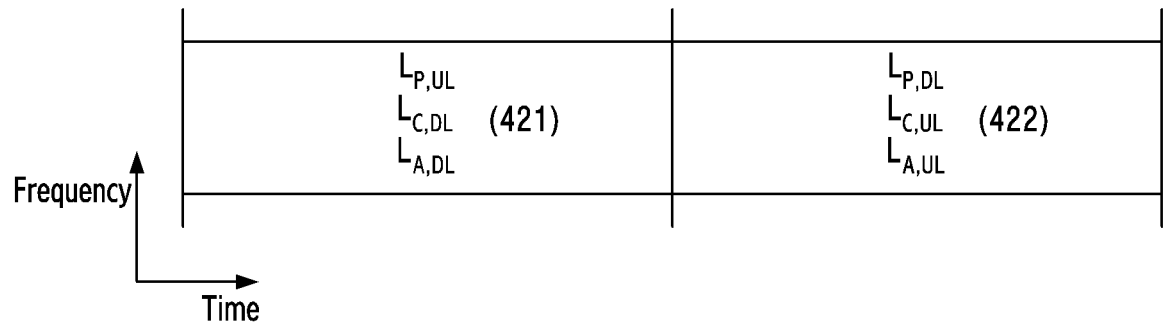

FIGS. 4A and 4B illustrate examples in which resources are multiplexed in frequency and spatial domains between an access link and a backhaul link in an IAB node according to various embodiments of the disclosure.

In FIGS. 4A and 4B, a method for reducing a latency by multiplexing a backhaul link and another backhaul link or a backhaul link and an access link in a frequency domain or in a spatial domain is described.

Referring to FIGS. 4A and 4B, similarly to FIGS. 3A and 3B, a process in which an IAB node 402 communicates with a parent node 401, a child IAB node 403, and a UE 404 is exemplified in FIG. 4A. A link between respective nodes will be described in greater detail. The parent node 401 may transmit a backhaul downlink signal to the IAB node 402 through a backhaul downlink $L_{P,DL}$ 411. The IAB node 402 may transmit a backhaul uplink signal to the parent node 401 through a backhaul uplink $L_{P,UL}$ 412. The IAB node 402 may transmit an access downlink signal to the UE 404 through an access downlink $L_{A,DL}$ 416. The UE 404 may transmit an access uplink signal to the IAB node 402 through an access uplink $L_{A,UL}$ 415. The IAB node 402 may transmit a backhaul downlink signal to the child IAB node 403 through a backhaul downlink $L_{C,DL}$ 413. The child IAB node 403 may transmit a backhaul uplink signal to the IAB node 402 through a backhaul uplink $L_{C,UL}$ 414. In the aforementioned example of FIGS. 4A and 4B, a subscript P means a backhaul link with the parent, a subscript A means an access link with the UE, and a subscript C means a backhaul link with the child.

A link relationship of FIGS. 4A and 4B is described based on the IAB node 402. From the viewpoint of the child IAB node 403, the parent node is the IAB node 402, and the child IAB node 403 may have another IAB child node at a lower level. In addition, from the viewpoint of the parent node 401, the child node is the IAB node 402, and the parent node 401 may have another IAB parent node at a higher level.

In the description above, a backhaul uplink/downlink signal and an access uplink/downlink signal may include data and control information, or a channel for transmitting the data and control information, or a reference signal required to decode the data and control information, or at least one of reference signals for reporting channel information.

FIG. 4B illustrates an example in which multiplexing is performed in a frequency domain or a spatial domain.

Since the IAB node has the half-duplex constraints at a moment as described above, signals which may be multiplexed in the frequency domain or the spatial domain are constrained. For example, considering the half-duplex constrains of the IAB node 402, a link multiplexable in a time domain in which the IAB node is able to perform transmission may be the backhaul uplink $L_{P,UL}$ 412, the backhaul downlink $L_{C,DL}$ 413, and the access downlink $L_{A,DL}$ 416. Accordingly, when the links (e.g., the backhaul uplink $L_{P,UL}$ 412, the backhaul downlink $L_{C,DL}$ 413, and the access downlink $L_{A,DL}$ 416) are multiplexed in the frequency domain or the spatial domain, the IAB node 402 may perform transmission in the same time domain through all of the links as in a resource region 421. In addition, the links multiplexable in the time domain in which the IAB node 402 is able to perform reception may be the backhaul downlink $L_{P,DL}$ 411, the backhaul uplink $L_{C,UL}$ 414, the access uplink $L_{A,UL}$ 415, or the like. Accordingly, when the links (i.e., the backhaul downlink $L_{P,DL}$ 411, the backhaul uplink $L_{C,UL}$ 414, and the access uplink $L_{A,UL}$ 415) are multiplexed in the frequency domain or the spatial domain, the IAB node 402 may perform reception in the same time domain through all of the links as in a resource region 422.

Multiplexing of the links provided in the embodiment of FIGS. 4A and 4B is one example, and it is also possible to multiplex only two links out of three links multiplexed in the frequency or spatial domain. That is, the IAB node may transmit/receive a signal by multiplexing some of multiplexable links.

Next, a structure of the IAB node will be described.

Various types of base station structures which are optimal for a service requirement have been studied in a 5G system to support various services such as high-capacity transmission, low-latency high-reliability, or large-scale IoT devices, and to reduce Capital Expenditures (CAPEX). In order to reduce the CAPEX and effectively process interference control in a 4G LTE system, a Cloud RAN (C-RAN) structure has been commercialized in which a data processor of the base station and a radio transceiver (or a Remote Radio Head (RRH)) are separated so that the data processor performs processing in a centralized manner and only the radio transceiver is disposed in a cell site. In the C-RAN structure, when the data processor of the base station transmits baseband digital In-phase Quadrature (IQ) data to the radio transceiver, an optical link of a Common Public Radio Interface (CPRI) standard is used in general. When data is transmitted to the radio transceiver, a large data capacity is required. For example, 614.4 Mbps is required when transmitting Internet Protocol (IP) data of 10 MHz, and a transfer rate of 1.2 Gbps is required when transmitting IP data of 20 MHz. Therefore, in order to reduce an enormous load of the optical link, a 5G RAN structure is designed to have various structures in such a manner that a base station is separated into a Central Unit (CU) and a Distributed Unit (DU) and a functional split is applied to the CU and the DU. Standardization is underway for various functional split options between the CU and the DU in 3GPP. In the functional split options, splitting is achieved for each function between protocol layers or within the protocol layer. The total number of options is 8, i.e., from an option 1 to an option 8. Among them, a structure preferentially considered in the current 5G base station structure is an option 2 and an option 7. In the option 2, an RRC and a Packet Data Convergence Protocol (PDCP) are located in the CU, and a Radio Link Control (RLC), a Medium Access Control (MAC), a Physical Layer (PHY), and a Radio Frequency (RF) are located in the DU. In the option 7, an RRC, a PDCP, an RLC, a MAC, and a higher PHY layer are located in the CU, and a lower PHY layer is located in the DU. Through the aforementioned functional split, it is possible to have a structure with deployment flexibility to separate and move NR network protocols between the CU and the DU. Through this structure, flexible HW implementation provides a cost-effective solution, and the separation structure between the CU and the DU enables load management, real-time performance optimization adjustment, and Network Functions Virtualization (NFV)/Software Defined Network (SDN). The configurable functional split is advantageously applicable to various application examples (a variable latency in transmission).

Therefore, the structure of the IAB node considering the aforementioned function split will be described with reference to FIG. 5.

Figure 5:
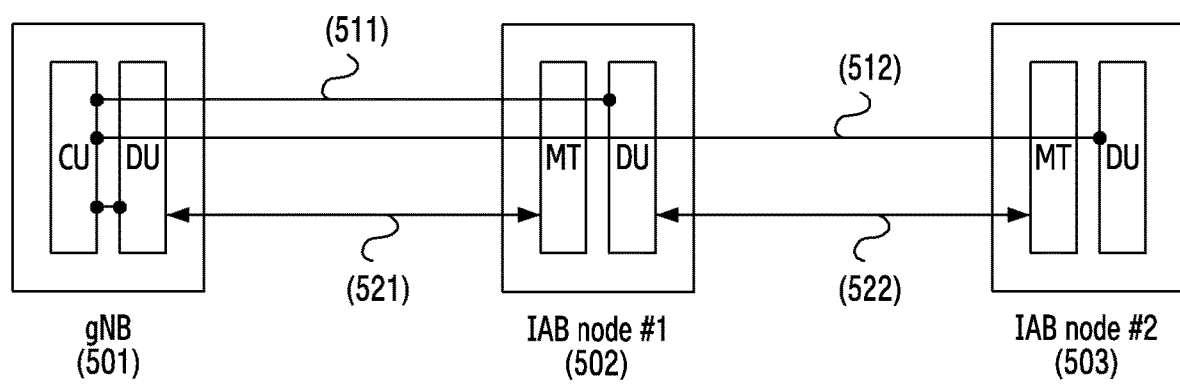
FIG. 5 schematically illustrates a structure of an IAB node according to an embodiment of the disclosure.

FIG. 5 schematically illustrates a structure of an IAB node according to an embodiment of the disclosure.

Referring to FIG. 5, a gNB 501 is constructed of a CU and a DU, and IAB nodes are constructed of a terminal function (hereinafter, MT) for transmitting/receiving data on a parent node and a backhaul link and a base station function (hereinafter, DU) for transmitting/receiving data in a child node and a backhaul link. In FIG. 5, an IAB node #1 502 is wirelessly coupled to the gNB 501 with one hop, and an IAB node #2 503 is wirelessly coupled to the gNB 501 via the IAB node #1 502 with two hops.

Referring to FIG. 5, the CU of the gNB 501 may control not only the DU of the gNB 501 but also DUs of all IAB nodes wirelessly coupled to the gNB 501, i.e., the IAB node #1 502 and the IAB node #2 503 (see 511 and 512). The CU of the gNB 501 may allocate a radio resource to the DU so that the DU is able to transmit/receive data with respect to an MT of a lower IAB node thereof. The allocation of the radio resource may be transmitted to the DU through system information or a higher layer signal such as RRC information or a physical layer signal by using an interface of an F1 Application Protocol (F1AP). The F1AP may refer to the 3GPP TS 38.473 standard. In this case, the radio resource may be constructed of a downlink time resource, an uplink time resource, a flexible time resource, or the like.

Hereinafter, a configuration of the radio resource for the TDM will be described in detail based on the IAB node #2 503. In particular, the configuration of the radio resource according to embodiments of the disclosure may be applied when resources are multiplexed in one carrier in a time domain between an access link and a backhaul link in an IAB node in FIGS. 3A and 3B. In addition, the configuration of the radio resource according to embodiments of the disclosure may also be applied when a backhaul link and another backhaul link, or a backhaul link and an access link, are multiplexed in a frequency domain of different carriers in FIGS. 4A and 4B.

The downlink time resource is a resource which allows the DU of the IAB node #2 503 to transmit downlink control/data and signals to the MT of the lower IAB node. The uplink time resource is a resource which allows the DU of the IAB node #2 503 to receive uplink control/data signals from the MT of the lower IAB node. The flexible time resource is a resource which may be utilized by the DU as the downlink time resource or the uplink time resource, and how the flexible time resource will be used by the MT of the lower IAB node may be indicted by the downlink control signal of the DU. Upon receiving the downlink control signal, the MT of the lower IAB node determines whether the flexible time resource will be utilized as the downlink time resource or the uplink time resource. When the downlink control signal is not received, the MT of the lower IAB node does not perform a transmission/reception operation. That is, the MT does not monitor or decode the downlink control channel on the resource or does not measure a signal on the resource. The MT does not perform the transmission/reception operation on the aforementioned resource. That is, the MT does not monitor or decode the downlink control channel on the resource or does not measure a signal on the resource. Regarding the downlink time resource, the uplink time resource, and the flexible time resource, two different types (or three different types including the time resource unavailable all the time) may be indicated from the CU to the DU.

A first type is a soft type. The CU of the gNB 501 may configure a soft-type downlink time resource, uplink time resource, and flexible time resource to the DU of the IAB node #2 503 by using an F1AP (an interface between the CU and the DU). In this case, regarding the configured soft-type resources, the IAB node #1 502, which is a parent IAB (or a DU or the parent IAB) of the IAB node #2 503, may explicitly (e.g., by means of a DCI format) or implicitly indicate to the IAB node #2 503, which is a child IAB (or a DU of the child IAB), whether the resource is available or not available. That is, when it is indicated that a specific resource is available, the DU of the IAB node #2 503 may utilize the resource for data transmission/reception with respect to the MT of the lower IAB node. That is, the DU of the IAB node #2 503 may utilize the resource to perform transmission in case of a downlink source and reception in case of an uplink resource. If it is indicated that the resource is unavailable, the IAB node #2 503 is not able to utilize the resource for data transmission/reception with respect to the MT of the IAB node. That is, the DU of the IAB node #2 503 is not able to perform transmission/reception by utilizing the resource.

A method of indicating availability of the soft-type resource by using a Downlink Control Information (DCI) format will be described in greater detail. In this embodiment, DCI may include an availability indicator for indicating availability of one or more successive uplink or downlink or flexible symbols.

In order to receive the DCI based on the DCI format, the IAB node #2 503 may receive location information of the availability indicator indicating the availability of the IAB node #2 in the DCI format, a table indicating availability for a time resource corresponding to a plurality of slots, and information on at least one mapping relationship of the availability indicator by means of a higher layer signal from a CU or a parent IAB, together with a cell Identification (ID) of the DU of the IAB node #2 503. A value (or indicator) indicating the availability of the successive uplink symbol, downlink symbol, or flexible symbol in one slot and the meaning of the value may be configured as shown in Table 1 below.

TABLE 1

| Value | Indication |
|---|---|
| 0 | No indication of availability for soft symbols |
| 1 | DL soft symbols are indicated available |
|  | No indication of availability for UL and Flexible soft symbols |
| 2 | UL soft symbols are indicated available |
|  | No indication of availability for DL and Flexible soft symbols |
| 3 | DL and UL soft symbols are indicated available |
|  | No indication of availability for Flexible soft symbols |
| 4 | Flexible soft symbols are indicated available |
|  | No indication of availability for DL and UL soft symbols |
| 5 | DL and Flexible soft symbols are indicated available |
|  | No indication of availability for UL soft symbols |
| 6 | UL and Flexible soft symbols are indicated available |
|  | No indication of availability for DL soft symbols |
| 7 | DL, UL, and Flexible soft symbols are indicated available |

When the availability indicator is indicated from the parent IAB to the IAB node #2 503 through a DCI format and the IAB node #2 receives the indication, the DU of the IAB node #2 503 may consider a method of interpreting a relationship between the downlink, uplink, or flexible time resource configured from the CU to the IAB DU and the aforementioned availability as follows.

A first method is a method in which the IAB DU expects that the number of values indicating the availability included in the availability indicator included in the DCI format is equal to the number of slots including a soft type constructed of successive symbols configured by the CU. According to this method, the IAB DU may determine that the availability is applied only to a slot including the soft type.

A second method is a method in which the IAB DU expects that the number of values indicating the availability included in the availability indicator included in the DCI format is equal to the number of all slots configured by the CU, i.e., all slots including a hard/soft/Non-Available (NA) type. Meanwhile, in this embodiment, the IAB DU may determine that the availability is applied only to a slot including the soft type, and may determine that the indicated availability is not applied to a slot including only the hard or the NA type, without the soft type.

In the first and second methods, the IAB DU may expect that the meaning of the value indicating the availability matches a downlink resource, uplink resource, or flexible resource configured by the CU. For example, when only a downlink soft resource or a downlink hard resource is present in a slot, the IAB DU may expect that only a value of 1 is indicated in Table 1 above. Accordingly, it may be expected that values including the availability of the uplink soft resource are not indicated among the values in Table 1 above.

In addition, at least in a flexible resource configured by the CU, the IAB DU may determine that it is possible to indicate whether a downlink resource is available or an uplink resource is available, in addition to a value indicating that the flexible resource is available. For example, in case of a flexible soft resource or a flexible hard resource, the DU of the IAB node may expect that it is possible to indicate a value of 1 or 2, instead of a value of 4 in Table 1 above. In this case, the DU of the IAB node #2 may determine that the flexible resource is available only in an uplink or a downlink by an indication of the parent IAB, instead of being available in the uplink or downlink by the determination of the UIAB node #2.

In addition, the IAB DU expects that a value of 0 may be indicated in Table 1 above even in any hard/soft or NA resource configured by the CU. In this case, the IAB DU determines that the hard/soft resource configured previously by the CU is not available, and until it is indicated that the resource is available at a later time according to the DCI format, considers that the resource is not utilized for data transmission/reception of the DU of the IAB node #2 with respect to the MT of the lower IAB node similarly to a case of an always unavailable resource type configured by the CU. Thereafter, when it is indicated that the resource is available again according to the DCI format, the DU of the IAB node #2 may utilize the resource as it is configured by the CU and received according to the DCI format.

The second type is a hard type, and the resources are always available between the DU and the MT. That is, irrespective of a transmission/reception operation of the MT of the IAB node #2, the DU of the IAB node #2 may perform transmission when the resource is a downlink time resource, and may perform reception when the resource is an uplink resource. When the resource is a flexible resource, transmission or reception may be performed by the determination of the IAB DU (i.e., in accordance with a DCI format indicating whether the flexible resource is a downlink resource or an uplink resource to the MT of the lower IAB node).

The third type is an always not-used or always non-available type, and the resources are not utilized for data transmission/reception of the DU of the IAB node #2 with respect to the MT.

The above types are received together when a downlink time resource, an uplink time resource, a flexible time resource, and a reserved time resource are received through a higher signal from the CU to the DU.

Referring to FIG. 5, the DU of the gNB 501 performs a typical base station operation, and the DU controls the MT of the IAB node #1 501 to perform scheduling so that data is transmitted/received (see 521). The DU of the IAB node #1 502 performs a typical base station operation, and the DU controls the MT of the IAB node #2 503 to perform scheduling so that data is transmitted/received (see 522).

According to an embodiment, the DU may indicate a radio resource so that data is transmitted/received with respect to the MT of the lower IAB node, based on a radio resource allocated from the CU. A configuration for the radio resource may be transmitted to the MT through system information or a higher layer signal or a physical layer signal. In this case, the radio resource may be constructed of a downlink time resource, an uplink time resource, a flexible time resource, a reserved time resource, or the like. The downlink time resource is a resource which allows the DU to transmit downlink control/data signals to the MT of the lower IAB node. The uplink time resource is a resource which allows the DU to receive uplink control/data signals from the MT of the lower IAB node. The flexible time resource is a resource which may be utilized by the DU as the downlink time resource or the uplink time resource, and how the flexible time resource will be used by the MT of the lower IAB node may be indicted by the downlink control signal of the DU. Upon receiving the downlink control signal, the MT determines whether the flexible time resource will be utilized as the downlink time resource or the uplink time resource. When the downlink control signal is not received, the MT does not perform a transmission/reception operation. That is, the MT does not monitor or decode the downlink control channel on the resource or does not measure a signal on the resource.

The downlink control signal may be signaled to the MT as a combination of a higher layer signal and a physical layer signal, and the MT may receive the signaling to determine a slot format in a specific slot. The slot format may be configured, by default, to start with a downlink symbol and end with an uplink symbol, with a flexible symbol located in the middle (e.g., a structure having order of D-F-U). When only the slot format is used, the DU of the IAB node may perform downlink transmission at the beginning of the slot. However, since the MT of the IAB node is configured with the aforementioned slot format (i.e., D-F-U structure), it is not possible to perform uplink transmission at the same time (see slot format indices 0 to 55 in Table 2 below). Accordingly, the slot format configured, by default, to start with the uplink symbol and end with the downlink symbol, with the flexible symbol located in the middle, may be exemplified as shown in Table 2 below (see slot format indices 56 to 96 in Table 2 below). The slot format exemplified in Table 2 below may be transmitted to the MT by using the downlink control signal, and may be configured in the DU from the CU by using the F1AP.

TABLE 2

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |

TABLE 2-continued

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | U | U | U | U |
| 27 | D | D | D | F | F | F | F | F | F | F | U | U | U | U |
| 28 | D | D | D | D | D | D | D | D | D | D | D | D | F | U |
| 29 | D | D | P | D | D | D | D | D | D | D | F | F | F | U |
| 30 | D | D | D | D | D | D | D | D | D | F | F | F | F | U |

The reserved time resource (e.g., #97 to #254) is a resource in which the DU is not able to transmit/receive data with respect to the MT of the lower IAB node, and the MT does not perform a transmission/reception operation in the resource. That is, the MT may not monitor or decode a downlink control channel in the resource, or may not measure a signal in the resource.

Accordingly, the MT in one IAB nodes is controlled by the DU in the IAB nodes to receive scheduling so that data is transmitted/received, and the DU in the same IAB nodes is controlled by the CU of the gNB 501. Therefore, since the MT and DU in one IAB are controlled by different entities, it is difficult to be coordinated on a real-time basis.

Figure 6:
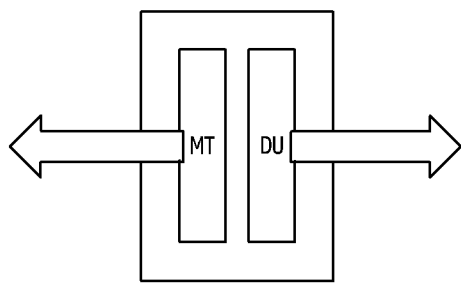
FIG. 6 is a drawing for explaining a communication method for simultaneously performing transmission/reception between a Mobile Termination (MT) and Distributed Unit (DU) in an IAB node in a wireless communication system according to an embodiment of the disclosure.
Figure 6:
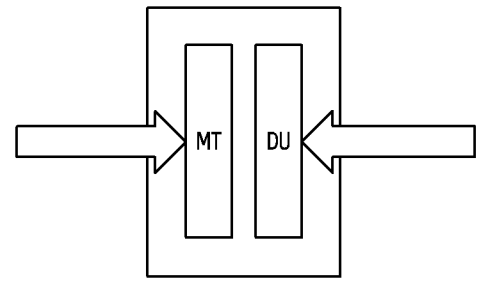
Figure 6:
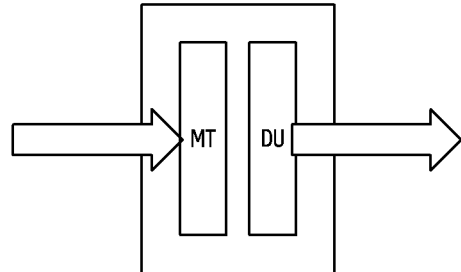
Figure 6:
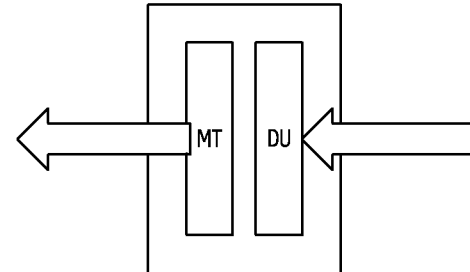

FIG. 6 is a drawing for explaining a communication method for simultaneously performing transmission/reception between an MT and DU in an IAB node in a wireless communication system according to an embodiment of the disclosure.

In FIG. 6, simultaneous transmission/reception between the MT and DU in one IAB node means that the MT performs transmission or reception and the DU performs transmission or reception in the same time resource at the same time by using the multiplexing scheme (FDM or SDM) described with reference to FIGS. 2A and 2B or to be described with reference to FIGS. 7 and 8.

Referring to FIG. 6, a first case 601 shows that both the MT and the DU transmit respective signals in one IAB node. In the first case 601, a signal transmitted by the MT of the IAB node may be received by the parent node or the DU of the base station through a backhaul uplink as described with reference to FIGS. 3A, 3B, 4A, 4B, and/or 5. In addition, in the first case 601, a signal transmitted by the DU of the IAB node at the same time (i.e., in the same time resource) may be received by the MT of the child IAB node through a backhaul downlink or may be received by an access terminal through an access downlink, as described with reference to FIGS. 3A, 3B, 4A, 4B, and/or 5.

A second case 602 shows that both the MT and the DU receive respective signals in one IAB node. In the second case 602, a signal received by the MT of the IAB node may be a signal transmitted from the parent IAB node or the DU of the base station through a backhaul downlink as described with reference to FIGS. 3A, 3B, 4A, 4B, and/or 5. In addition, in the second case 602, a signal received by the DU of the IAB node at the same time (i.e., in the same time resource) may be a signal transmitted by the MT of the child IAB node through a backhaul uplink or transmitted by an access terminal through an access uplink, as described with reference to FIGS. 3A, 3B, 4A, 4B, and 5.

A third case 603 shows that both the MT and the DU receive or transmit respective signals in the IAB node. That is, in the third case 603, the MT in the IAB node may receive a signal thereof, and the DU in the IAB node may transmit a signal thereof at the same time. In the third case 603, a signal received by the MT of the IAB node may be a signal transmitted from the parent IAB node or the DU of the base station through a backhaul downlink as described with reference to FIGS. 3A, 3B, 4A, 4B, and/or 5. In addition, in the third case 603, a signal transmitted by the DU of the IAB node at the same time (i.e., in the same time resource) may be received by the MT of the child IAB node through a backhaul downlink or received by an access terminal through an access downlink, as described with reference to FIGS. 3A, 3B, 4A, 4B, and/or 5.

A fourth case 604 shows that both the MT and the DU transmit or receive respective signals in the IAB node. That is, in the fourth case 604, the MT in the IAB node may transmit a signal thereof, and the DU in the IAB node may receive a signal thereof at the same time. In the fourth case 604, a signal transmitted by the MT of the IAB node may be received by the parent IAB node or the DU of the base station through a backhaul uplink as described with reference to FIGS. 3A, 3B, 4A, 4B, and/or 5. In addition, in the fourth case 604, a signal received by the DU of the IAB node at the same time (i.e., in the same time resource) may be a signal transmitted by the MT of the child IAB node through a backhaul uplink or transmitted by an access terminal through an access uplink, as described with reference to FIGS. 3A, 3B, 4A, 4B, and/or 5.

The disclosure provides embodiments for a method of configuring a DU resource type in a situation where both the MT and the DU transmit or receive respective signals in one IAB node in the first case 601 and/or the second case 602, and a procedure of a parent IAB node and an IAB node according to the method. Hereinafter, embodiments of the disclosure may be applied to not only the first case 601 and the second case 602 but also the third case 603 and the fourth case 604.

Figure 7:
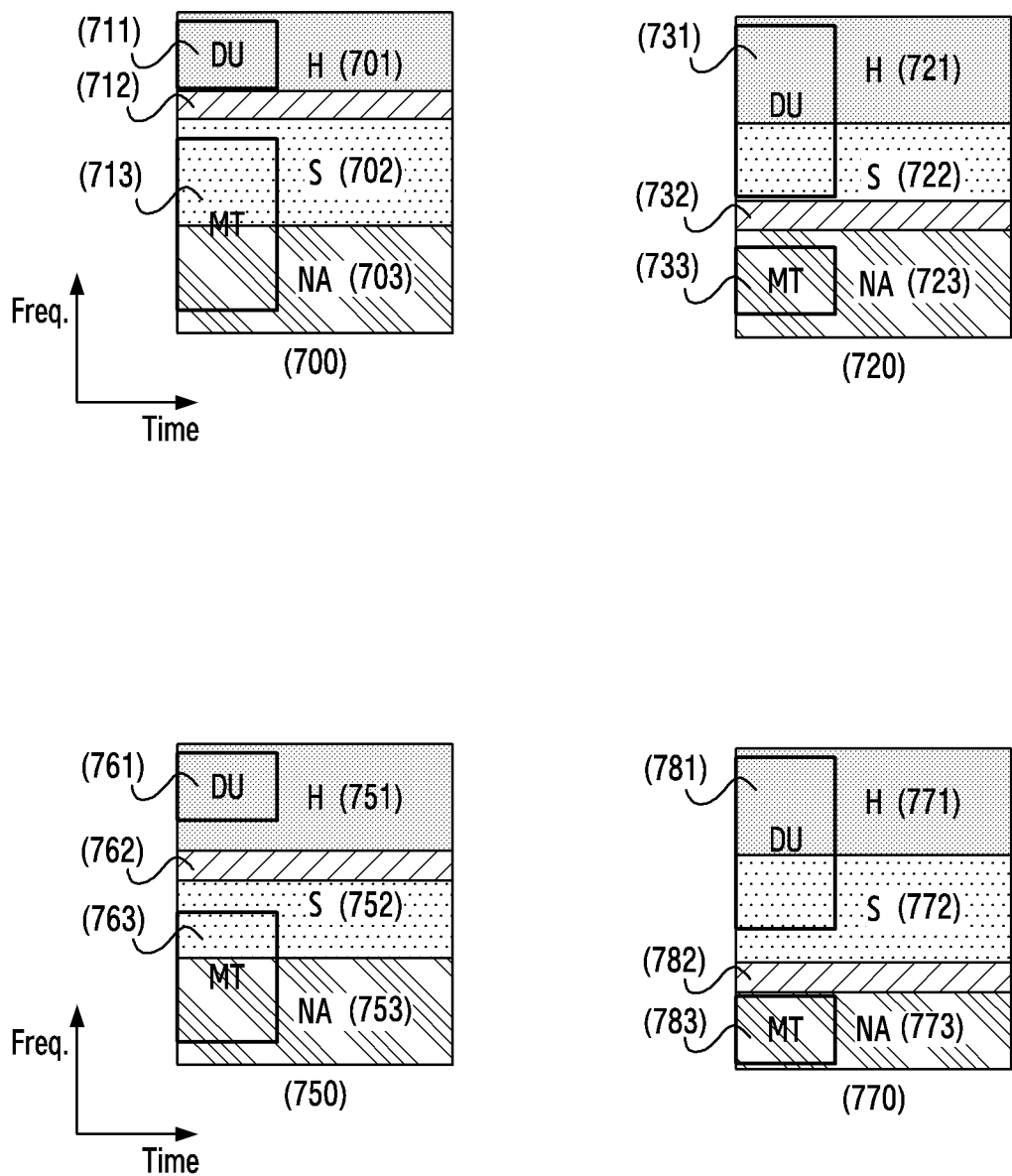
FIG. 7 is a drawing for explaining a DU resource type for supporting Frequency Division Multiplexing (FDM) of an IAB node and an operation of an IAB node in a wireless communication system according to an embodiment of the disclosure.

FIG. 7 is a drawing for explaining a DU resource type for supporting FDM of an IAB node and an operation of an IAB node in a wireless communication system according to an embodiment of the disclosure.

Referring to FIG. 7, when resources of the DU and MT of the IAB node are multiplexed with FDM, the DU and MT of the IAB node perform transmission/reception simultaneously in adjacent frequency resources at the same time, which results in occurrence of transmission/reception interference between the DU and MT of the IAB node. A guard frequency domain may be considered to mitigate the transmission/reception interference. According to whether the guard frequency domain is generated by the DU of the IAB node or by the DU of the parent IAB node, a DU resource type of the IAB node in a frequency/time domain and an operation of the DU and MT of the IAB node, based on the DU resource type, may vary. Accordingly, a method of configuring the DU resource type in the frequency-time domain, a method of generating a guard frequency, and a DU and MT operation of the IAB node, based on the guard frequency generation method and the DU resource type, will be descried with reference to FIG. 7.

Hereinafter, the disclosure discloses a DU resource type configuration in a frequency-time domain.

According to an embodiment, a DU of a gNB may allocate a radio resource to a DU so that the DU is able to transmit/receive data with respect to an MT of a lower IAB node thereof. The allocation of the radio resource may be transmitted to the DU through system information or a higher layer signal such as RRC information or a physical layer signal by using an interface of an F1 Application Protocol (F1AP). In this case, the radio resource may be constructed of a downlink frequency-time resource, an uplink frequency-time resource, and/or a flexible frequency-time resource, or the like. Unlike in a radio time resource which utilizes a full band in the carrier described in FIG. 5, a resource may be configured in a frequency-time domain corresponding to a specific frequency (e.g., at least one Physical Resource Blocks (PRB) or a frequency domain in which the at least one PRB is allocated in units of allocation on frequency) and a specific time (for example, at least one slot) in one carrier. Hereinafter, frequency-time will be omitted for convenience. Similarly to the description on the radio time resource, information on three types (or at least one of the three types) may be indicated from the CU to the DU of the IAB node with respect to the downlink resource, uplink resource, and/or flexible resource. A first type is a soft type. The CU of the gNB may configure a soft-type downlink resource, uplink resource, and flexible resource to the DU of the IAB node by using an F1AP (an interface between the CU and the DU). In this case, regarding the configured soft-type resources, the IAB node, which is a parent IAB (or a DU or the parent IAB) of the IAB node, may explicitly (e.g., by means of a DCI format) or implicitly indicate to the IAB node, which is a child IAB (or a DU of the child IAB), whether the resource is available or not available. That is, when it is indicated that a specific resource is available, the DU of the IAB node may utilize the resource for data transmission/reception with respect to the MT of the lower IAB node. In addition, the DU of the IAB node may utilize the resource to perform transmission in case of a downlink source and reception in case of an uplink resource. If it is indicated that the resource is unavailable, the IAB node is not able to utilize the resource for data transmission/reception with respect to the MT of the IAB node. That is, the DU of the IAB node is not able to perform transmission/reception by utilizing the resource.

Hereinafter, the disclosure discloses a method of indicating availability of a resource of the soft type by using a DCI format. In this embodiment, the DCI format may include an availability indicator for indicating availability of one or more successive uplink or downlink or flexible symbols.

In order to receive the DCI format, the IAB node may receive location information of the availability indicator indicating the availability of the IAB node in the DCI format, a table indicating availability for a plurality of frequency-time resources, and information on at least one mapping relationship of the availability indicator by means of a higher layer signal from a CU or a parent IAB, together with a cell Identification (ID) of the DU of the IAB node.

As an example, if a higher layer signal for availability indication of the soft time resource is reused for availability indication of a soft time-frequency resource to support FDM when the TDM is supported, the IAB node may determine that an availability indication value of an availability indication table applied to an uplink/downlink/flexible symbol of a specific slot in a higher layer signal for availability indication of the soft time resource when the TDM is supported is applied to a specific frequency Resource Block (RB) set of a soft time-frequency resource of the same slot. In this case, the aforementioned method may be applied when the number of specific frequency RB sets of the soft time-frequency resource of the slot is one. Accordingly, when the availability indication value is applied to a time resource of a soft resource of a specific slot, whether it is applied to a soft time-frequency resource of a specific RB set may be indicated by RRC signaling, MAC CE, or physical signaling (e.g., DCI) from a parent IAB regarding whether to use a TDM support resource (e.g., the radio resource of FIG. 5) or whether to use an FDM support resource (e.g., the radio resource of FIG. 7). For example, when the IAB node receives an indication for using the TDM support resource, the IAB node may determine that the availability indication value is applied to the time resource of the soft resource of the specific slot. In addition, when the IAB node receives an indication for using the FDM support resource, the IAB node may determine that the availability indication value is applied to the soft time-frequency resource of the specific RB set. Alternatively, whether the availability indication value is applied to the time resource of the soft resource of the specific slot or applied to the soft time-frequency resource of the specific RB set may be determined by a determination of the IAB node for determining whether to use the TDM support resource or whether to use the FDM support resource. For example, when the IAB node determines that the TDM support resource is used, the IAB node may determine that the availability indication value is applied to the time resource of the soft resource of the specific slot. In addition, when the IAB node determines that the FDM support resource is used, the IAB node may determine that the availability indication value is applied to the soft time-frequency resource of the specific RB set. The determination on the TDM or FDM support resource may be performed by the IAB node, based on whether to satisfy one of conditions including power control for MT uplink transmission of the IAB node in simultaneous transmission, power control for MT downlink reception of the IAB node in simultaneous reception, whether MT uplink transmission of the IAB node and DU downlink transmission of the IAB node have matched timing in simultaneous transmission, whether MT downlink reception of the IAB node and DU uplink reception of the IAB node have matched timing in simultaneous reception, or the like. The determination performed by the IAB node on whether to use the TDM support resource or whether to use the FDM support resource may be reported to the parent IAB node or the CU through RRC signaling, MAC CE, or physical signaling (e.g., DCI).

According to an embodiment, the TDM support resource may be constructed of a downlink time resource, an uplink time resource, a flexible time resource, a reserved time resource, or the like. According to an embodiment, the FDM support resource may be constructed of a downlink frequency-time resource, an uplink frequency-time resource, and/or a flexible frequency-time resource or the like.

As another example, the availability indication of the soft time-frequency resource for supporting the FDM is configured through an additional higher layer signal other than a higher layer signal for the availability indication of the soft time-frequency resource when the TDM is supported, a table indicating availability for the plurality of frequency-tome resources may include availability corresponding to at least one frequency RB set starting from a slot (e.g., a slot i) in which the MT of the IAB node receives the DCI format. That is, a row having a K-th index (mapped to an availability indicator K in the DCI format) in the table may include an availability value corresponding to at least one frequency RB set in each of slots from a slot i to a slot i+N.

A mapping relationship of the availability indicator for the plurality of frequency-time resources may be defined by using Table 3, Table 4, or Table 5 below. According to an embodiment, Table 3 may be defined in a standard so as to be utilized commonly when the TDM or the FDM is supported. In addition, according to an embodiment, Table 4 or Table 5 may be defined in a standard to as to be utilized only when the FDM is supported.

TABLE 3

| Value | Indication |
|---|---|
| 0 | No indication of availability for soft symbols or RB set(s) |
| 1 | DL soft symbols or RB set(s) are indicated available<br>No indication of availability for UL and Flexible soft symbols or RB set(s) |
| 2 | UL soft symbols or RB set(s)are indicated available<br>No indication of availability for DL and Flexible soft symbols or RB set(s) |
| 3 | DL and UL soft symbols or RB set(s) are indicated available<br>No indication of availability for Flexible soft symbols or RB set(s) |
| 4 | Flexible soft symbols or RB set(s) are indicated available<br>No indication of availability for DL and UL soft symbols or RB set(s) |
| 5 | DL and Flexible soft symbols or RB set(s) are indicated available<br>No indication of availability for UL soft symbols or RB set(s) |
| 6 | UL and Flexible soft symbols or RB set(s) are indicated available<br>No indication of availability for DL soft symbols or RB set(s) |
| 7 | DL, UL, and Flexible soft symbols or RB set(s) are indicated available |

TABLE 4

| Value | Indication |
|---|---|
| 0 | No indication of availability for soft RB set(s) |
| 1 | DL soft RB set(s) are indicated available<br>No indication of availability for UL and Flexible soft RB set(s) |
| 2 | UL soft RB set(s)are indicated available<br>No indication of availability for DL and Flexible soft RB set(s) |
| 3 | DL and UL soft RB set(s) are indicated available<br>No indication of availability for Flexible soft RB set(s) |
| 4 | Flexible soft RB set(s) are indicated available<br>No indication of availability for DL and UL soft RB set(s) |
| 5 | DL and Flexible soft RB set(s) are indicated available<br>No indication of availability for UL soft RB set(s) |
| 6 | UL and Flexible soft RB set(s) are indicated available<br>No indication of availability for DL soft RB set(s) |
| 7 | DL, UL, and Flexible soft RB set(s) are indicated available |

TABLE 5

| Value | Indication |
|---|---|
| 0 | No indication of availability for soft RB set(s) |
| 1 | Soft RB set(s) are indicated available |

The second type is a hard type, and the resources are always utilized between the DU and the MT. That is, irrespective of a transmission/reception operation of the MT of the IAB node, the DU of the IAB node may perform transmission when the resource is a downlink time resource, and may perform reception when the resource is an uplink resource. When the resource is a flexible resource, transmission or reception may be performed by the determination of the IAB DU (i.e., in accordance with a DCI format indicating whether the flexible resource is a downlink resource or an uplink resource to the MT of the lower IAB node).

The third type is an always not-used or always Non-Available (NA) type, and the resources of this type are not available for data transmission/reception of the DU of the IAB node with respect to the MT.

The above types are received together when a downlink resource, an uplink resource, a flexible resource, and a reserved resource are received through a higher signal from the CU to the DU.

Hereinafter, the disclosure discloses a method of generating a guard frequency according to a DU resource type, and a DU and MT operation of an IAB node.

As a first method, a method in which the guard frequency is generated by a DU of an IAB node which is a child IAB node of a base station/parent IAB node is disclosed. A first FIG. 700 of FIG. 7 illustrates that a DU resource type of the IAB node, i.e., a hard type 701, a soft type 702, and an NA type 703, is configured in a frequency-time domain by a CU. In this case, it is assumed that the DU of the IAB node determines that a resource of the soft type 702 is not utilized. A resource 711 utilized in data transmission/reception in practice by the DU of the IAB node and a resource 713 utilized in data transmission/reception in practice by the MT of the IAB node with respect to the base station/parent IAB node may be present in a resource of the aforementioned type. In this case, a guard frequency domain 712 may be configured in a resource of the hard type 701 to mitigate an effect of DU transmission/reception of the IAB node on MT transmission/reception of the IAB node. A time-frequency resource in the hard type 701 is a resource which may be utilized by the DU of the IAB node irrespective of the effect of the MT of the IAB node. In the remaining time-frequency domain other than the hard type 701, that is, a soft type 702 determined as not to be utilized by the IAB DU and an NA type 703 not available for the IAB DU, the guard frequency domain may be configured within a resource of the hard type 701 under the responsibility of the DU of the IAB node so that data transmission/reception of the base station/parent IAB node and the MT of the IAB node is not affected by interference.

A second FIG. 720 of FIG. 7 illustrates another example in which a DU resource type of the IAB node, i.e., a hard type 721, a soft type 722, and an NA type 723, is configured in a frequency-time domain by a CU. In this case, it is assumed that the DU of the IAB node determines that a resource of the soft type 722 is utilized. A resource 731 utilized in data transmission/reception in practice by the DU of the IAB node and a resource 733 utilized in data transmission/reception in practice by the MT of the IAB node with respect to the base station/parent IAB node may be present in a resource of the aforementioned type. In this case, a guard frequency domain 732 may be configured in a resource of the soft type 722 determined to be utilized by the DU of the IAB node, so as to mitigate an effect of DU transmission/reception of the IAB node on MT transmission/reception of the IAB node. A time-frequency resource in the soft type 722 is a resource which may be utilized by the DU of the IAB node without having an effect on the MT of the IAB node. In the remaining time-frequency domain other than the hard type 721 and the soft type 722, that is, an NA type 723 not available for the IAB DU, the guard frequency domain may be configured within a resource of the soft type 722 determined to be utilized by the DU of the IAB under the responsibility of the DU of the IAB node so that data transmission/reception of the base station/parent IAB node and the MT of the IAB node is not affected by interference.

In summary, as the first method, in a method in which the guard frequency is generated by the DU of the IAB node which is the child IAB node of the base station/parent IAB node, the DU of the IAB node may transmit/receive data, without considering an effect on the MT of the IAB node operating at the same time-frequency in the resource of the hard type. However, a guard frequency may be configured within the hard-type resource to mitigate an effect of interference on the MT of the IAB node operating in another time-frequency.

Next, the DU of the IAB node may transmit/receive data, without having an effect on the MT of the IAB node operating at the same time-frequency in the soft-type resource determined to be utilized. Not having an effect on the MT of the IAB node may be described as following cases. That is, the MT of the IAB node does not perform transmission/reception during a frequency-time resource of the DU of the IAB node. Alternatively, transmission/reception of the DU of the IAB node during the frequency-time resource does not lead to a change in transmission/reception of the MT of the IAB node. Alternatively, the MT of the IAB node receives a DCI format indicating that the soft-type resource is available. However, to mitigate an effect of interference on the MT of the IAB node operating in the remaining time-frequency other than the hard-type resource, a guard frequency may be configured in the soft-type resource determined to be available.

As a second method, a method in which the guard frequency is generated by a base station/parent IAB node which performs transmission/reception with respect to an MT of an IAB node which is a child node is described. A third FIG. 750 of FIG. 7 illustrates that a DU resource type of the IAB node, i.e., a hard type 751, a soft type 752, and an NA type 753, is configured in a frequency-time domain by a CU. In this case, it is assumed that the DU of the IAB node determines that a resource of the soft type 752 is not utilized. A resource 761 utilized in data transmission/reception in practice by the DU of the IAB node and a resource 763 utilized in data transmission/reception in practice by the MT of the IAB node with respect to the base station/parent IAB node may be present in a resource of the aforementioned type. In this case, a guard frequency domain 762 may be configured in a resource of the soft type 752 to mitigate an effect of DU transmission/reception of the IAB node on MT transmission/reception of the IAB node. A time-frequency resource in the hard type 751 is a resource which may be utilized by the DU of the IAB node without having to consider the effect on the MT of the IAB node Due to transmission/reception in the hard type 751, in the remaining time-frequency domain other than the hard type 751, that is, a soft type 752 determined as not to be utilized by the IAB DU and an NA type 753 not available for the IAB DU, an effect of interference on data transmission/reception of the base station/parent IAB node and the MT of the IAB node is not considered. Therefore, the guard frequency domain 762 may be configured within the resource of the soft type 752 under the responsibility of the DU of the base station/parent IAB node so that there is no effect of interference.

A fourth FIG. 770 of FIG. 7 illustrates another example in which a DU resource type of the IAB node, i.e., a hard type 771, a soft type 772, and an NA type 773, is configured in a frequency-time domain by a CU. In this case, it is assumed that the DU of the IAB node determines that a resource of the soft type 772 is utilized. A resource 781 utilized in data transmission/reception in practice by the DU of the IAB node and a resource 783 utilized in data transmission/reception in practice by the MT of the IAB node with respect to the base station/parent IAB node may be present in a resource of the aforementioned type. In this case, a guard frequency domain 782 may be configured in a resource of the NA type 773 determined not to be available for the DU of the IAB node, so as to mitigate an effect of DU transmission/reception of the IAB node on MT transmission/reception of the IAB node. A time-frequency resource in the soft type 772 is a resource which may be utilized by the DU of the IAB node without having an effect on the MT of the IAB node. Due to transmission/reception in the soft type 722, in the remaining time-frequency domain other than the hard type 771, that is, an NA type 773 not available for the IAB DU, the DU of the IAB node does not consider an effect of interference on data transmission/reception of the base station/parent IAB node and the MT of the IAB node. Therefore, the guard frequency domain 782 may be configured within the resource of the NA type 773 under the responsibility of the DU of the base station/parent IAB node so that there is no effect of interference.

In summary, as the second method, in a method in which the guard frequency is generated by the DU of the base station/parent IAB node which performs transmission/reception with respect to the MT of the IAB node, the DU of the IAB node may transmit/receive data, without considering an effect on the MT of the IAB node operating at the same time-frequency in the resource of the hard type. However, an effect of interference on the MT of the IAB node operating in a different time-frequency is not considered, and the base station/parent IAB node may configure the guard frequency within the soft-type resource determined as not to be available to mitigate the interference.

Hereinafter, the disclosure may transmit/receive data without affecting the MT of the IAB node operating within the same time-frequency in the soft-type resource determined to be available. However, the DU of the IAB node does not consider the interference effect on the MT of the IAB node operating in a different time-frequency other than the soft-type and hard-type resources. In order to mitigate the interference, the base station/parent IAB node may configure the guard frequency in the NA-type resource configured to be available.

The method of configuring the guard frequency may be limited to a case where the guard frequency is necessary, and the configuring of the guard frequency may be coordinated between the IAB node and the base station/parent IAB node. That is, when it is necessary to configure the guard frequency (or when the IAB node reports that it has capability of utilizing FDM), the IAB node may report the necessity of the guard frequency to the base station/parent IAB node through a higher layer signal (e.g., RRC signaling, MAC CE)/physical signal (e.g., DCI)/backhaul signal, and the base station/parent IAB node may indicate the configuration of the guard frequency through the higher layer signal, physical signal/backhaul signal.

Which method will be used may be determined in a standard, and whether to use the first method or the second method may be indicated to the IAB node, which is the child IAB node, by the DU of the base station/parent IAB node through the higher layer signal/physical signal or the backhaul signal. The IAB node may receive the indication and apply the method of configuring the guard frequency. Alternatively, the first method and the second method may be both used so that the guard frequency is configured by each of the IAB node and the base station/parent IAB node, thereby cancelling the interference effect to the maximum extent possible.

The guard frequency configured by using the first method or the second method may be shared by being transmitted/received through the higher layer signal/physical signal/backhaul signal between the IAB node and the base station/parent IAB node.

In the first method or the second method, an allocation position in a frequency domain of a DU resource type may be as follows. A hard type, a soft type, and an NA type may be configured sequentially by a CU in an ascending order or descending order of a frequency (PRB) index, and the IAB node may receive the configuration. In case of the soft type, the CU may be configured or the base station/parent IAB node may be indicated by the DCI format so that a soft type determined to be utilized by the IAB DU may be located after the hard type, and a soft type determined to be utilized by the IAB DU may be located before the NA type, and the IAB node may receive the configuration and the indication.

Figure 8:
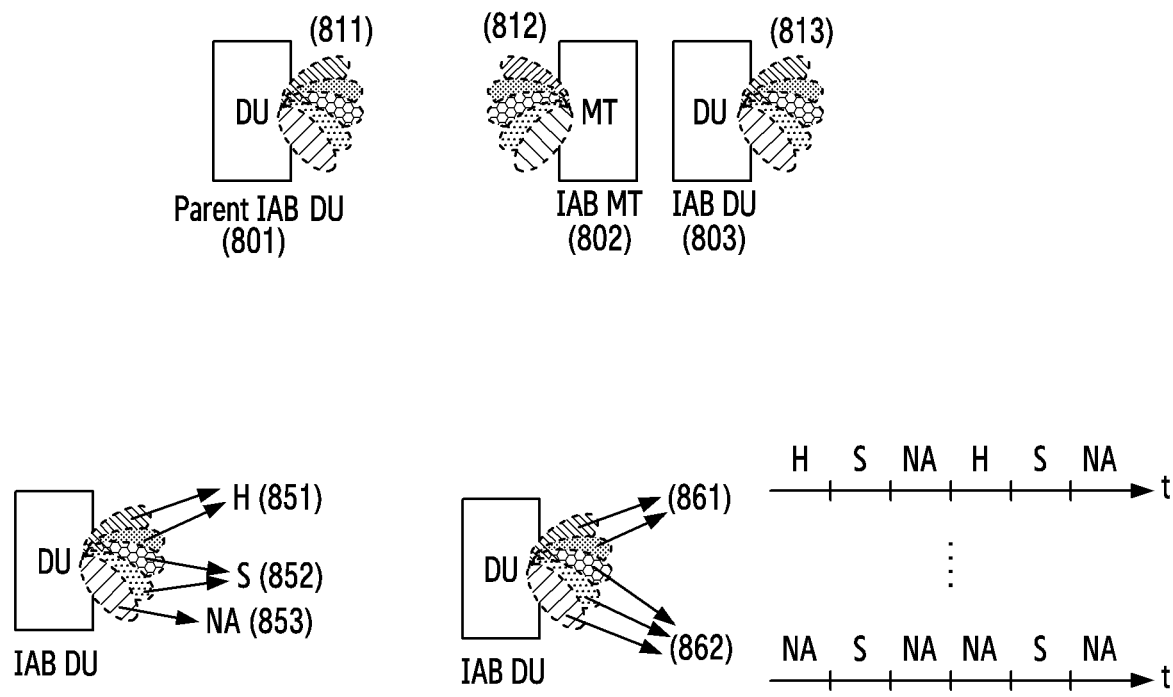
FIG. 8 illustrates a DU resource type for supporting Spatial Division Multiplexing (SDM) of an IAB node and an operation of the IAB node in a wireless communication system according to an embodiment of the disclosure.

FIG. 8 illustrates a DU resource type for supporting SDM of an IAB node and an operation of the IAB node in a wireless communication system according to an embodiment of the disclosure.

Referring to FIG. 8, when the resource of the MT and DU of the IAB node is multiplexed with SDM, an upper part of FIG. 8 schematically illustrates that a base station/parent IAB node 801 and IAB nodes 802 and 803 which are child IAB nodes transmit/receive data by utilizing SDM, that is, by using beams 811, 812, and 813 in a spatial domain. The base station/parent IAB node 801 may configure up to 128 Transmission Configuration Indication (TCI) states to the IAB nodes 802 and 803 for the MT and DU of the IAB node through a higher layer signal/backhaul signal. The TCI state may include beam-related information as follows.

TCI state ID

At least one Quasi-Co-Location (QCL) information

The QCL information may include a cell ID, a Bandwidth Part (BWP, a reference signal (e.g., CSI-RS ID information when the reference signal is CSI-RS, SSB index information when the reference signal is SSB), and information on whether the QCL type is a type A, a type B, a type C, or a type D.

Next, the base station/parent IAB node 801 may activate up to 8 TCI states for the MT and DU of the IAB node among up to 128 TCI states to the IAB nodes 802 and 802 through a MAC CE signal/backhaul signal.

The base station/parent IAB node 801 may indicate at least one TCI state to the IAB nodes 802 and 803 among the up to 8 activated TCI states through a physical signal. The MT and DU of the IAB node may transmit/receive data through at least one specific beam based on the indicated at least one TCI state.

In this case, the DU 803 of the IAB node may coordinate a beam to be used with the base station/parent IAB node 801.

As a first method for coordinating a beam, a CU may configure a hard type 851, a soft type 852, and an NA type 853 to the DU 803 for specific beams corresponding to the TCI state. In other words, a DU resource type may be configured in units of the beam. In a beam of the hard type 851, the DU 803 of the IAB node may transmit/receive data by utilizing the beam of the hard type 851 irrespective of an effect on a transmission/reception beam of the MT 802 of the IAB node. In a beam of the soft type 852, the DU 803 of the IAB node may transmit/receive data by utilizing the beam of the soft type 852 without having an effect on the transmission/reception beam of the MT 802 of the IAB node. Not having an effect on the MT 802 of the IAB node may be further described as following cases. That is, the MT of the IAB node does not perform transmission/reception during a frequency-time resource of the DU of the IAB node. Alternatively, transmission/reception of the DU of the IAB node during the frequency-time resource does not lead to a change in transmission/reception of the MT of the IAB node. Alternatively, the MT of the IAB node receives a DCI format indicating that the soft-type resource is available.

Next, in a beam of the NA type 853, the DU 803 of the IAB node does not transmit/receive data.

As a second method for coordinating beams 861 and 862, a CU may alternately configure the hard type 851, the soft type 852, and the NA type 853 to the DU 803 during a specific time (a slot or a symbol) for specific beams corresponding to the TCI state. The base station/parent IAB node 801 may transmit the configuration information to the IAB node through a higher layer signal (e.g., RRC signaling, MAC CE)/backhaul signal. The configuration information may include bitmap information for a hard type, soft type, and NA type at a specific time, period and offset information of each hard type, soft type, and NA type, and TCI state information to which the DU type information is applied.

As a third method for coordinating a beam, a CU may configure only the hard type and the NA type to the DU 803 for specific beams corresponding to the TCI state. In case of the soft type, it is difficult to determine an effect of the DU of the IAB node on the MT of the IAB node in the soft type. Therefore, it is possible to apply only the hard type and the NA type. The hard type and the NA type may be applied by using the first or second method.

As a fourth method for coordinating a beam, a CU may configure only a beam available or non-available for the DU, instead of the hard type and the NA type, to the DU 803 of the IAB node for specific beams corresponding to the TCI state. The beam available for the DU or the beam non-available for the DU may be configured by the base station/parent IAB node through a higher layer signal/backhaul signal. In some embodiments, the available beam and the non-available beam may be fixed regardless of time, and information on such a beam may be configured. In addition, in some embodiments, the configuration information may include information (e.g., bitmap information) on a beam available or non-available for the DU at a specific time. In addition, in some embodiments, the configuration information may include period and offset information for the beam available or non-available for the DU. In addition, in some embodiments, the configuration information may include TCI state information to which information of the available beam and/or the non-available beam at the time is applied. The configuration information according to embodiments of the disclosure may be configured to include at least one or combinations of the aforementioned information.

Figure 9A:
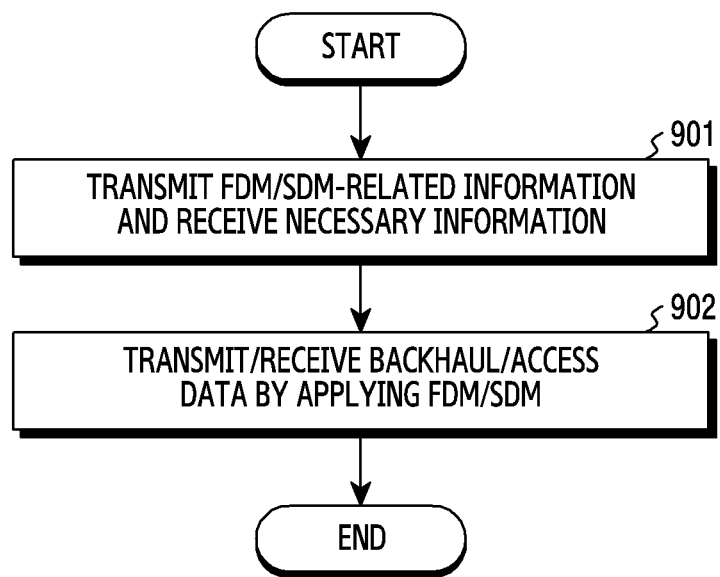
FIG. 9A illustrates an operation of a base station/parent IAB node in a wireless communication system according to an embodiment of the disclosure.

FIG. 9A illustrates an operation of a base station/parent IAB node in a wireless communication system according to an embodiment of the disclosure.

Referring to FIG. 9A, in operation 901, the base station/parent IAB node (e.g., the parent IAB illustrated in FIGS. 7 and/or 8) may transmit FDM or SDM-related information to the IAB node and receive necessary information from the IAB node. As described above, the information may include information required for switching to the FDM or the SDM, information required to support the FDM or the SDM, or the like. The information required to support the FDM or the SDM may include radio resource allocation information including a DU resource type, information related to resource availability of a soft type, information on necessity of a guard frequency, information on a method of configuring the guard frequency, TCI state configuration information, DU resource type configuration information for specific beams corresponding to a TCI state, and/or configuration information on whether the DU is available or not-available. In operation 902, the base station/parent IAB node may transmit/receive backhaul data with respect to the IAB node by applying the FDM or the SDM.

Figure 9B:
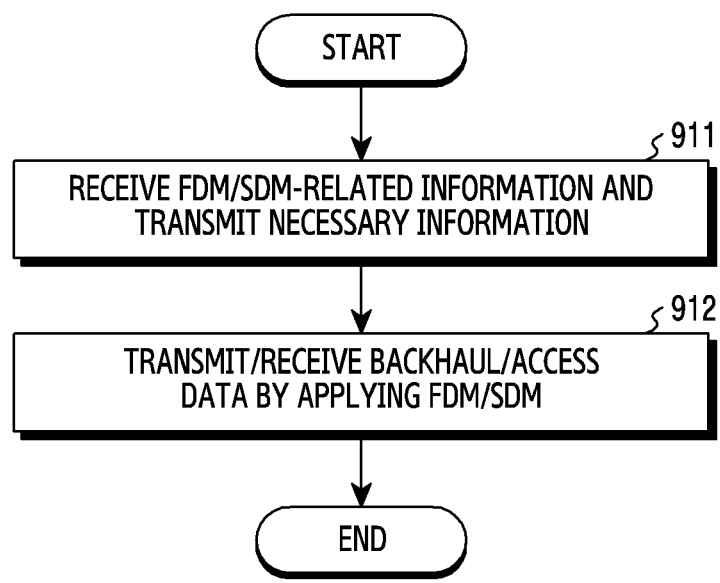
FIG. 9B illustrates an operation of an IAB node which is a child IAB node in a wireless communication system according to an embodiment of the disclosure.

FIG. 9B illustrates an operation of an IAB node which is a child IAB node in a wireless communication system according to an embodiment of the disclosure.

Referring to FIG. 9B, in operation 911, the IAB node may receive FDM or SDM-related information from a base station/parent IAB node and transmit necessary information to the base station/parent IAB node. As described above, the information may include information required for switching to the FDM or the SDM, information required to support the FDM or the SDM, or the like. The information required to support the FDM or the SDM may include radio resource allocation information including a DU resource type, information related to resource availability of a soft type, information on necessity of a guard frequency, information on a method of configuring the guard frequency, TCI state configuration information, DU resource type configuration information for specific beams corresponding to a TCI state, and/or configuration information on whether the DU is available or not-available. In operation 912, the IAB node may transmit/receive backhaul data with respect to the base station/parent IAB node by applying the FDM or the SDM.

Figure 10:
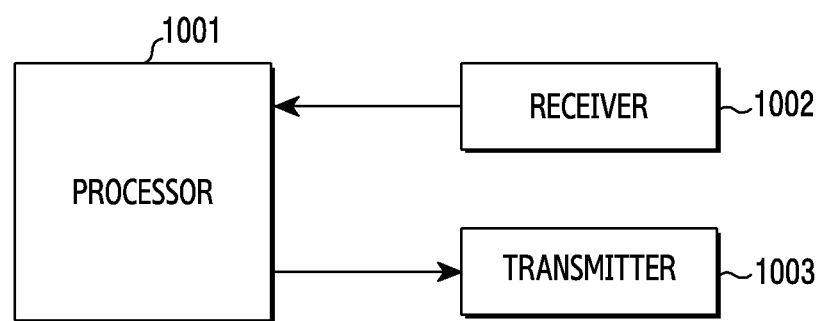
FIG. 10 illustrates a structure of a terminal according to an embodiment of the disclosure.
Figure 11:
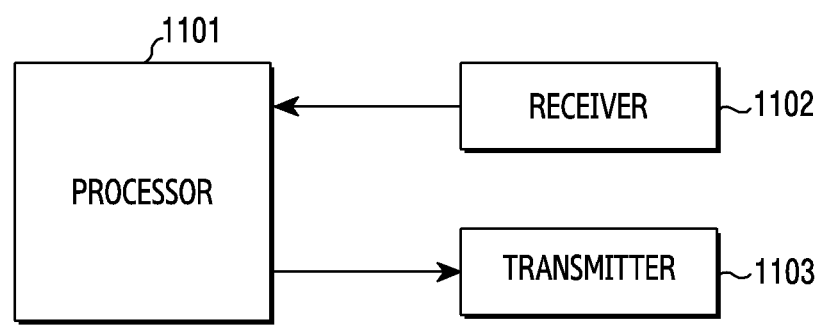
FIG. 11 illustrates a structure of a base station (a donor base station) according to an embodiment of the disclosure.
Figure 12:
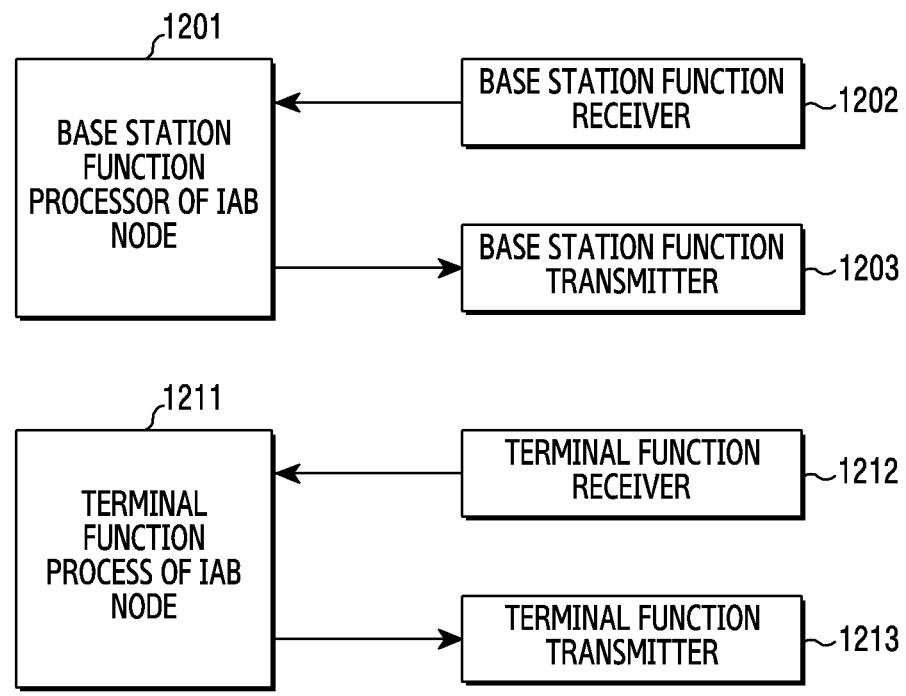
FIG. 12 illustrates a structure of an IAB node according to an embodiment of the disclosure.

In order to perform the embodiments of the disclosure, FIGS. 10 and 11 illustrate a transmitter, receiver, and processor of a terminal and base station, respectively. The transmitter and the receiver may be referred to as a transceiver. In addition, FIG. 12 illustrates a device of the IAB node. The aforementioned embodiments illustrate a transmission/reception method of a base station (a donor base station) which performs transmission/reception in a backhaul link with respect to the IAB node through mmWave and a terminal which performs transmission/reception in an access link with respect to the IAB node, when a signal is transmitted/received in the backhaul link or the access link through an IAB node in a 5G communication system. To perform this, the transmitter, receiver, and processor of the base station, terminal, and IAB node may operate according to each of the embodiments.

FIG. 10 illustrates a structure of a terminal according to an embodiment of the disclosure.

Referring to FIG. 10, the terminal of the disclosure may include a processor 1001, a receiver 1002, and a transmitter 1003.

The processor 1001 may control a series of processes so that the terminal operates, based individually or in combination on embodiments of the disclosure described above with reference to FIGS. 1, 2A, 2B, 3A, 3B, 4A, 4B, and 5 to 8. For example, access link transmission/reception or the like with respect to an IAB node according to embodiments of the disclosure may be controlled differently. The receiver 1002 and the transmitter 1003 may be collectively referred to as a transceiver in an embodiment of the disclosure. The transceiver may transmit/receive a signal with respect to a base station. The transceiver may transmit/receive a signal with respect to the base station. The signal may include at least one of control information and data. To this end, the transceiver may include an RF transmitter which up-converts and amplifies a frequency of a signal to be transmitted and an RF receiver which performs low-noise amplification on a signal to be received and down-converts a frequency of the signal. In addition, the transceiver may receive a signal through a wireless channel and output the signal to the processor 1001, and may transmit the signal output from the processor 1001 through the wireless channel.

FIG. 11 illustrates a structure of a base station (a donor base station) according to an embodiment of the disclosure.

Referring to FIG. 11, the base station of the disclosure may include a processor 1101, a receiver 1102, and/or a transmitter 1103.

The processor 1101 may control a series of processes so that the base station operates, based individually or in combination on embodiments of the disclosure described above with reference to FIGS. 1, 2A, 2B, 3A, 3B, 4A, 4B, and 5 to 8. For example, backhaul link transmission/reception and access link transmission/reception or the like with respect to an IAB node according to embodiments of the disclosure may be controlled differently. The receiver 1102 and the transmitter 1103 may be collectively referred to as a transceiver in an embodiment of the disclosure. The transceiver may transmit/receive a signal with respect to a terminal or a lower (child) IAB node. The signal may include at least one of control information and data. To this end, the transceiver may include an RF transmitter which up-converts and amplifies a frequency of a signal to be transmitted and an RF receiver which performs low-noise amplification on a signal to be received and down-converts a frequency of the signal. In addition, the transceiver may receive a signal through a wireless channel and output the signal to the processor 1101, and may transmit the signal output from the processor 1101 through the wireless channel.

FIG. 12 illustrates a structure of an IAB node according to an embodiment of the disclosure.

Referring to FIG. 12, according to an embodiment of the disclosure, the IAB node is an IAB node which performs transmission/reception with respect to a lower (child) IAB node through a (wireless) backhaul link, and may include a base station function controller 1201, a base station function receiver 1202, and a base station function transmitter 1203, and the IAB node. In addition, the IAB node is an IAB node which initially accesses to a higher (parent) IAB node and/or a donor base station and transmits/receives a higher layer signal before transmission/reception is performed through a backhaul link and performs transmission/reception with respect to the higher (parent) IAB node and the donor base station through a (wireless) backhaul link, and may include a terminal function controller 1211, a terminal function receiver 1212, and a terminal function transmitter 1213.

The base station function controller 1201 of the IAB node may control a series of processes so that the IAB node operates together with the base station according to the aforementioned embodiment of the disclosure, and for example, may perform the aforementioned function of the DU of the IAB node. For example, the base station function controller 1201 may differently control backhaul link transmission/reception with respect to a lower IAB node and access link transmission/reception with respect to the terminal according to an embodiment of the disclosure. The base station function receiver 1202 and the base station function transmitter 1203 may be collectively referred to as a first transceiver in an embodiment of the disclosure. The first transceiver may transmit/receive a signal with respect to a lower (child) IAB node and the terminal. The signal may include at least one of control information and data. To this end, the first transceiver may include an RF transmitter which up-converts and amplifies a frequency of a signal to be transmitted and an RF receiver which performs low-noise amplification on a signal to be received and down-converts a frequency of the signal. In addition, the first transceiver may receive a signal through a wireless channel and output the signal to the base station function controller 1201, and may transmit the signal output from the base station function controller 1201 through the wireless channel.

The terminal function controller 1211 of the IAB node may control a series of processes in which a lower (child) IAB node operates together with a terminal to transmit/receive data with respect to a donor base station or a higher (parent) IAB node according to the aforementioned embodiment of the disclosure, and for example, may perform the aforementioned function of the MT of the IAB node. For example, the terminal function controller 1211 may differently control transmission/reception through a (wireless) backhaul link with respect to the donor base station and/or the higher (parent) node according to an embodiment of the disclosure. The terminal function receiver 1212 and the terminal function transmitter 1213 may be collectively referred to as a second transceiver in an embodiment of the disclosure. The second transceiver may transmit/receive a signal with respect to the donor base station and the higher IAB node. The signal may include at least one of control information and data. To this end, the second transceiver may include an RF transmitter which up-converts and amplifies a frequency of a signal to be transmitted and an RF receiver which performs low-noise amplification on a signal to be received and down-converts a frequency of the signal. In addition, the second transceiver may receive a signal through a wireless channel and output the signal to the terminal function controller 1211, and may transmit the signal output from the terminal function controller 1211 through the wireless channel.

Meanwhile, the base station function controller 1210 of the IAB node included in the IAB node of FIG. 12 and the terminal function controller 1211 of the IAB node may be integrated with each other and implemented as an IAB node controller. In this case, the IAB node controller 1200 may control functions of the DU and MT together in the IAB node. The base station function controller 1201, the terminal function controller 1211, and the IAB node controller may be implemented as at least one processor. The first transceiver and the second transceiver may be provided individually or may be implemented as one integrated transmitter.

A beam described in the specification means a spatial flow of a signal in a wireless channel, and is formed by one or more antennas (or antenna elements). Such a forming process may be referred to as beamforming. According to various embodiments, an antenna array or the like in which a plurality of antenna elements are deployed densely may be used. In this case, a shape (e.g., coverage) depending on a signal gain may have directivity. A beam used in signal transmission may be referred to as a transmission beam, and a beam used in signal reception may be referred to as reception beam. That is, as an example of one implementation, the IAB node may include an antenna array for the MT or an antenna array for the DU.

When the IAB node transmits a signal in the direction of the transmission beam, a signal gain of the device may increase. When the signal is transmitted by using the transmission beam, the signal may be transmitted through a spatial domain reception filter of a signal transmitting side, i.e., a transmitting end. When a signal is transmitted using a plurality of transmission beams, the transmitting end may transmit the signal while changing a spatial domain transmission filter. For example, when the signal is transmitted using the same transmission beam, the transmitting end may transmit the signal through the same spatial domain transmission filter. For example, when the MT of the IAB node receives CSI-RSs for reception beam search (e.g., 3GPP TS 38.214 repetition='on'), the IAB node may assume that the CSI-RSs are transmitted through the same spatial domain transmission filter.

When the IAB node receives a signal in the direction of the reception beam, a signal gain of the device may increase. When the signal is received by using the reception beam, the signal may be received through a spatial domain reception filter of a signal receiving side, i.e., a receiving end. For example, when the IAB node simultaneously receives several signals transmitted using different beams, the IAB node may receive the signals by using a single spatial domain receive filter, or may receive the signals by using multiple simultaneous spatial domain receive filters.

In addition, in the specification, a reference signal may be used as a signal transmitted using a beam, and may include, for example, a Demodulation-Reference Signal (DM-RS), a Channel State Information-Reference Signal (CSI-RS), a Synchronization Signal/Physical Broadcast Channel (SS/PBCH), and a Sounding Reference Signal (SRS). In addition, as a configuration for each reference signal, an indicator such as a CSI-RS resource or an SRS-resource or the like may be used, and this configuration may include information associated with the beam. The information associated with the beam may mean whether a corresponding configuration (e.g., CSI-RS resource) uses the same spatial domain filter of another configuration (e.g., another CSI-RS resource in the same CSI-RS resource set) or uses another spatial domain filter, or to which reference signal it is subjected to Quasi-Co-Located (QCL), and if it is subjected to the QCL, which type (e.g., QCL type A, B, C, D) it is. The QCL type may be defined as follows.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the specification, according to various embodiments, the IAB node may measure beam quality to obtain cell quality and per-duplex quality. The IAB node may obtain beam quality, based on a CSI-RS or SS/PBCH block.

On the other hand, embodiments of the disclosure disclosed in the specification and drawings are presented only as a specific example for clarity and are not intended to limit the scope of the disclosure. That is, it is apparent to those of ordinary skill in the art to which the disclosure pertains that other modifications based on the technical concept of the disclosure are possible. In addition, each of the embodiments may be operated optionally in combination with each other.

The methods according to the embodiments described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an integrated access and backhaul (IAB) node including an IAB distributed unit (DU) and an IAB mobile terminal (MT) in a wireless communication system, the method comprising:
   receiving, by the IAB DU, configuration information on a symbol of the IAB DU via a F1 application protocol (F1AP) interface, from a central unit (CU) of a base station, wherein the symbol is configured as one of a hard, a soft, or unavailable; and
   in case that a first resource block (RB) set is configured as a soft based on the configuration information, performing at least one of a transmission or a reception of a first signaling by the IAB DU on the first soft RB set,
   wherein a transmission or a reception of a second signaling by the IAB MT on the first soft RB set is performed and not changed due to use of the first soft RB set by the IAB DU.

2. The method of claim 1, further comprising:
   receiving, by the IAB MT from a DU of the base station, downlink control information (DCI) on a resource availability for a soft symbol or a second soft RB set of a symbol of the IAB DU via a Uu interface; and
   performing at least one of a transmission or a reception of a third signaling by the IAB DU on the second soft RB set in case that the second soft RB set is indicated as available.

3. The method of claim 2, further comprising:
   receiving, by the IAB MT from the DU of the base station, a radio resource control (RRC) message including information on whether the resource availability is for the soft symbol or the second soft RB set via the Uu interface,
   wherein a resource indicated as available is identified as the second soft RB set based on the information.

4. The method of claim 2,
   wherein a transmission or a reception of a fourth signaling by the IAB MT on the second soft RB set of the symbol not indicated as available is performed.

5. The method of claim 1,
   wherein, in case that the RB set of the symbol is configured as the hard, at least one of a transmission or a reception of a fifth signaling by the IAB DU on the RB set is performed, and
   wherein, in case that the RB set of the symbol is configured as the unavailable, a transmission and a reception of a sixth signaling by the IAB DU on the RB set are not performed.

6. A method performed by a base station including a central unit (CU) and a distributed unit (DU) in a wireless communication system, the method comprising:
   transmitting, by the CU of the base station, configuration information on a symbol of an integrated access and backhaul (IAB) DU via a F1 application protocol (F1AP) interface, to the IAB DU included in an IAB node, wherein the symbol is configured as at least one of a hard, a soft, or unavailable,
   in case that a first resource block (RB) set is configured as a soft based on the configuration information, wherein at least one of a transmission or a reception of a first signaling by the IAB DU on the first soft RB set is performed, and
   wherein a transmission or a reception of a second signaling by an IAB mobile terminal (MT) included in the IAB node on the first soft RB set is performed and not changed due to use of the first soft RB set by the IAB DU.

7. The method of claim 6, further comprising:
   transmitting, by the DU of the base station to the IAB MT, downlink control information (DCI) on a resource availability for a soft symbol or a second soft RB set of a symbol of the IAB DU via a Uu interface,
   wherein at least one of a transmission or a reception of a third signaling by the IAB DU on the second soft RB set is performed in case that the second soft RB set is indicated as available.

8. The method of claim 7, further comprising:
   transmitting, by the DU of the base station to the IAB MT, a radio resource control (RRC) message including information on whether the resource availability is for the soft symbol or the second soft RB set via the Uu interface,
   wherein a resource indicated as available is identified as the second soft RB set based on the information.

9. The method of claim 7,
   wherein a transmission or a reception of a fourth signaling by the IAB MT on the second soft RB set of the symbol not indicated as available is performed.

10. The method of claim 6,
wherein, in case that the RB set of the symbol is configured as the hard, at least one of a transmission or a reception of a fifth signaling by the IAB DU on the RB set is performed, and
wherein, in case that the RB set of the symbol is configured as the unavailable, a transmission and a reception of a sixth signaling by the IAB DU on the RB set are not performed.

11. An integrated access and backhaul (IAB) node including an IAB distributed unit (DU) and an IAB mobile terminal (MT) in a wireless communication system, the IAB node comprising:
a transceiver; and
at least one processor coupled with the transceiver and configured to:
receive, by the IAB DU, configuration information on a symbol of the IAB DU via a F1 application protocol (F1AP) interface, from a central unit (CU) of a base station, wherein the symbol is configured as at least one of a hard, a soft, or unavailable, and
in case that a first resource block (RB) set is configured as a soft based on the configuration information, perform at least one of a transmission or a reception of a first signaling by the IAB DU on the first soft RB set,
wherein a transmission or a reception of a second signaling by the IAB MT on the first soft RB set is performed and not changed due to use of the first soft RB set by the IAB DU.

12. The IAB node of claim 11, wherein the at least one processor is further configured to:
receive, by the IAB MT from a DU of the base station, downlink control information (DCI) on a resource availability for a soft symbol or a second soft RB set of a symbol of the IAB DU via a Uu interface, and
perform at least one of a transmission or a reception of a third signaling by the IAB DU on the second soft RB set in case that the second soft RB set is indicated as available.

13. The IAB node of claim 12, wherein the at least one processor is further configured to:
receive, by the IAB MT from the DU of the base station, a radio resource control (RRC) message including information on whether the resource availability is for the soft symbol or the second soft RB set via the Uu interface,
wherein a resource indicated as available is identified as the second soft RB set based on the information.

14. The IAB node of claim 12,
wherein a transmission or a reception of a fourth signaling by the IAB MT on the second soft RB set of the symbol not indicated as available is performed.

15. The IAB node of claim 11,
wherein, in case that the RB set of the symbol is configured as the hard, at least one of a transmission or a reception of a fifth signaling by the IAB DU on the RB set is performed, and
wherein, in case that the RB set of the symbol is configured as the unavailable, a transmission and a reception of a sixth signaling by the IAB DU on the RB set are not performed.

16. A base station including a central unit (CU) and a distributed unit (DU) in a wireless communication system, the base station comprising:
a transceiver; and
at least one processor coupled with the transceiver and configured to:
transmit, by the CU of the base station, configuration information on a symbol of an integrated access and backhaul (IAB) DU via a F1 application protocol (F1AP) interface, to the IAB DU included in an IAB node, wherein the symbol is configured as at least one of a hard, a soft, or unavailable,
in case that a first resource block (RB) set is configured as a soft based on the configuration information, wherein at least one of a transmission or a reception of a first signaling by the IAB DU on the first soft RB set is performed, and
wherein a transmission or a reception of a second signaling by an IAB mobile terminal (MT) included in the IAB node on the first soft RB set is performed and not changed due to use of the first soft RB set by the IAB DU.

17. The base station of claim 16,
wherein the at least one processor is further configured to:
transmit, by the DU of the base station to the IAB MT, downlink control information (DCI) on a resource availability for a soft symbol or a second soft RB set of a symbol of the IAB DU via a Uu interface, and
wherein at least one of a transmission or a reception of a third signaling by the IAB DU on the second soft RB set is performed in case that the second soft RB set is indicated as available.

18. The base station of claim 17,
wherein the at least one processor is further configured to:
transmit, by the DU of the base station to the IAB MT, a radio resource control (RRC) message including information on whether the resource availability is for the soft symbol or the second soft RB set via the Uu interface, and
wherein a resource indicated as available is identified as the second soft RB set based on the information.

19. The base station of claim 17,
wherein a transmission or a reception of a fourth signaling by the IAB MT on the second soft RB set of the symbol not indicated as available is performed.

20. The base station of claim 16,
wherein, in case that the RB set of the symbol is configured as the hard, at least one of a transmission or a reception of a fifth signaling by the IAB DU on the RB set is performed, and
wherein, in case that the RB set of the symbol is configured as the unavailable, a transmission and a reception of a sixth signaling by the IAB DU on the RB set are not performed.

* * * * *